(12) United States Patent
Porras et al.

(10) Patent No.: US 9,571,523 B2
(45) Date of Patent: Feb. 14, 2017

(54) SECURITY ACTUATOR FOR A DYNAMICALLY PROGRAMMABLE COMPUTER NETWORK

(71) Applicant: SRI International, Menlo Park, CA (US)

(72) Inventors: Phillip A. Porras, Cupertino, CA (US); Keith M. Skinner, Sunnyvale, CA (US); Steven M. Dawson, Belmont, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 120 days.

(21) Appl. No.: 14/322,617

(22) Filed: Jul. 2, 2014

(65) Prior Publication Data

US 2014/0317684 A1 Oct. 23, 2014

Related U.S. Application Data

(63) Continuation-in-part of application No. 13/801,855, filed on Mar. 13, 2013, which is a continuation-in-part of application No. 13/801,871, filed on Mar. 13, 2013.

(60) Provisional application No. 61/650,287, filed on May 22, 2012, provisional application No. 61/991,345, (Continued)

(51) Int. Cl.
*H04L 29/06* (2006.01)
*H04L 29/08* (2006.01)

(52) U.S. Cl.
CPC .......... *H04L 63/20* (2013.01); *H04L 63/0227* (2013.01); *H04L 67/327* (2013.01); *H04L 63/126* (2013.01)

(58) Field of Classification Search
CPC ...... H04L 45/38; H04L 63/20; H04L 63/0227; H04L 67/327; H04L 63/126
See application file for complete search history.

(56) References Cited

U.S. PATENT DOCUMENTS 6,381,639 B1  4/2002  Thebaut et al.
7,757,276 B1  7/2010  Lear
(Continued)

OTHER PUBLICATIONS

Porras, Phillip, et al., "A Security Enforcement Kernel for OpenFlow Networks," HotSDN'12, Aug. 13, 2012, 6 pages.
(Continued)

*Primary Examiner* — Farid Homayounmehr
*Assistant Examiner* — Christopher C Harris
(74) *Attorney, Agent, or Firm* — Barnes & Thornburg LLP

(57) ABSTRACT

A network security policy may be implemented at network switches as a set of active packet disposition directives. In a dynamically programmable network, the network switches can be dynamically reprogrammed with packet disposition directives. A security actuator receives flow policy directives from a number of network applications. The flow policy directives express higher-level network security policy goals, including blocking and/or redirecting network traffic. The security actuator converts a flow policy directive into one or more packet disposition directives. The packet disposition directives may include trigger rules to cause network communications to be monitored for matching trigger packets. An automated mechanism initiated by the security actuator may cause trigger packets to be forwarded to the security actuator for analysis. The security actuator may generate packet disposition directives in response to receiving the trigger packets.

28 Claims, 10 Drawing Sheets

Related U.S. Application Data filed on May 9, 2014, provisional application No. 61/892,668, filed on Oct. 18, 2013.

(56) References Cited

U.S. PATENT DOCUMENTS

| | | | | |
|---|---|---|---|---|
| 2003/0037129 | A1* | 2/2003 | Beadles | H04L 29/06 709/220 |
| 2005/0278431 | A1* | 12/2005 | Goldschmidt | H04L 41/0869 709/207 |
| 2006/0069590 | A1 | 3/2006 | Fox et al. | |
| 2007/0162966 | A1 | 7/2007 | Agrawal et al. | |
| 2008/0289026 | A1 | 11/2008 | Abzarian et al. | |
| 2009/0023431 | A1 | 1/2009 | Sim et al. | |
| 2009/0172815 | A1 | 7/2009 | Gu et al. | |
| 2011/0261825 | A1 | 10/2011 | Ichino | |
| 2011/0273988 | A1 | 11/2011 | Tourrilhes et al. | |
| 2011/0317559 | A1 | 12/2011 | Kern et al. | |
| 2012/0044935 | A1* | 2/2012 | Hama | H04L 12/4625 370/389 |
| 2012/0155467 | A1* | 6/2012 | Appenzeller | H04L 45/54 370/392 |
| 2013/0010600 | A1* | 1/2013 | Jocha | H04L 43/026 370/236.2 |
| 2013/0070762 | A1* | 3/2013 | Adams | H04L 49/70 370/389 |
| 2013/0128746 | A1* | 5/2013 | Yedavalli | H04L 45/38 370/238 |
| 2013/0311675 | A1 | 11/2013 | Kancherla | |
| 2013/0329601 | A1 | 12/2013 | Yin et al. | |
| 2013/0347059 | A1 | 12/2013 | Fong et al. | |
| 2014/0003232 | A1 | 1/2014 | Guichard et al. | |
| 2014/0033275 | A1 | 1/2014 | Kawamoto | |
| 2014/0059225 | A1 | 2/2014 | Gasparakis et al. | |

OTHER PUBLICATIONS

Porras, Phillip, "Empowering Dynamic Network Defenses Across OpenFlow Networks," SDN Security Seminars 2012, Feb. 28, 2012, 26 pages.

Porras, Phillip, et al., "An Overview of the FortNOX Security Kernel," available at http://www.openflowsec.org/, Dec. 2012, 29 pages.

Chua, Roy, "Interview with Phil Porras: Lack of Secure Controller Hurting OpenFlow?" Jul. 3, 2012, available at http://www.sdncentral.com/sdn-blog/phil-porras-openflow-secure-controller/2012/07/, printed Jun. 12, 2013, 11 pages.

Chua, Roy, "SDN Security—An Oxymoron? New Interview with Phil Porras of SRI International," Feb. 26, 2013, available at http://www.sdncentral.com/sdn-blog/sdn-security-oxymoron-phil-porras-sri/2013/02/, printed Jun. 12, 2013, 9 pages.

Shin, Seugwon, et al., "FRESCO: Modular Composable Security Services for Software-Defined Networks," ISOC Network and Distributed System Security Symposium, Feb. 2013, 16 pages.

Porras, Phillip, "OpenFlowSec.org Demonstration Videos," video material available at http://www.openflowsec.org/OpenFlow_Security/Demo_Vids.html, accessed Jun. 14, 2013, 7 pages.

Ferro, Greg, "OpenFlow vs. Traditional Networks," InformationWeek Reports, Jan. 2012, 13 pages.

Sherwood, Rob, et al., "FlowVisor: A Network Virtualization Layer," available at http://openflowswitch.org/downloads/technicalreports/open-flow-tr-2009-1-flowvisor.pdf, Oct. 14, 2009, 15 pages.

U.S. Appl. No. 13/801,855, filed Mar. 13, 2013, 55 pages.
U.S. Appl. No. 61/650,287, filed May 22, 2012, 20 pages.
U.S. Appl. No. 13/801,871, filed Mar. 13, 2013, 56 pages.
U.S. Appl. No. 61/991,345, filed May 9, 2014, 115 pages.
U.S. Appl. No. 61/892,668, filed Oct. 18, 2013, 38 pages.

* cited by examiner

FROM FIG. 9

```
// For otherwise unrecognized remapIP to IP1 trigger
// packets, pass-through data to IP1 from remapIP
match = { IN_PORT:        <remapIP_SW_port>
          DL_TYPE:        ethernet.IP_TYPE,
          DL_SRC:         <remapIP_MAC>
          NW_SRC:         <remapIP>
          NW_SRC_MASK:    <USE_ALL_BITS>
          DL_DEST:        <IP1_member_MAC>
          NW_DEST:        <IP1_member>
          NW_DEST_MASK:   <USE_ALL_BITS>
          NETWORK_PROTOCOL: <TRIGGER_PROTOCOL>
          [ TRANSPORT_SRC:  <remapIP_PORT> ]
          [ TRANSPORT_DEST: <IP1_member_PORT> ] }
attrib = [5 second idle-timeout, zero hard-timeout,
          min_priority+3]
actions = { OFPAT_OUTPUT: <IP1_member_SW_PORT> }
install_flow_rule (switchID, match, actions, attrib)
```

SECURITY ACTUATOR FOR A DYNAMICALLY PROGRAMMABLE COMPUTER NETWORK

CROSS-REFERENCE TO RELATED APPLICATIONS

This application claims the benefit of and priority to U.S. Provisional Patent Application Ser. No. 61/991,345, filed May 9, 2014, and U.S. Provisional Patent Application Ser. No. 61/892,668, filed Oct. 18, 2013, and is a continuation-in-part of U.S. Utility patent application Ser. Nos. 13/801,855 and 13/801,871, filed Mar. 13, 2013, both of which claim the benefit of and priority to U.S. Provisional Patent Application Ser. No. 61/650,287, filed May 22, 2012; and each of the foregoing applications is incorporated herein by this reference in its entirety.

GOVERNMENT RIGHTS

This invention was made in part with government support under contract number FA8750-11-C-0249 awarded by the Air Force Research Laboratory and contract number W911NF-06-1-0316 awarded by the Army Research Office. The Government has certain rights in this invention.

BACKGROUND

Software-defined networking refers to an approach to building a computer network that allows for programmable network switch infrastructures, in which the rules that determine how the network switches are to process network flows can be dynamically specified and changed. Such programmability is useful, for instance, in the management of virtual computing resources that may be spawned or terminated on demand. The OPENFLOW network model is one example of a protocol that may be used to implement software-defined networking.

According to traditional notions of network perimeter defense, network security may be provided by a well-defined (e.g., static) security policy that can be instantiated for a particular network topology. In traditional network environments, the security policy often can be deployed and enforced consistently across the network infrastructure.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

FIGS. 6-10 are schematic diagrams of various embodiments of pseudocode for flow policy directives that may be executed by the security actuator of FIGS. 1 and 2.

DETAILED DESCRIPTION OF THE DRAWINGS

Figure 1:
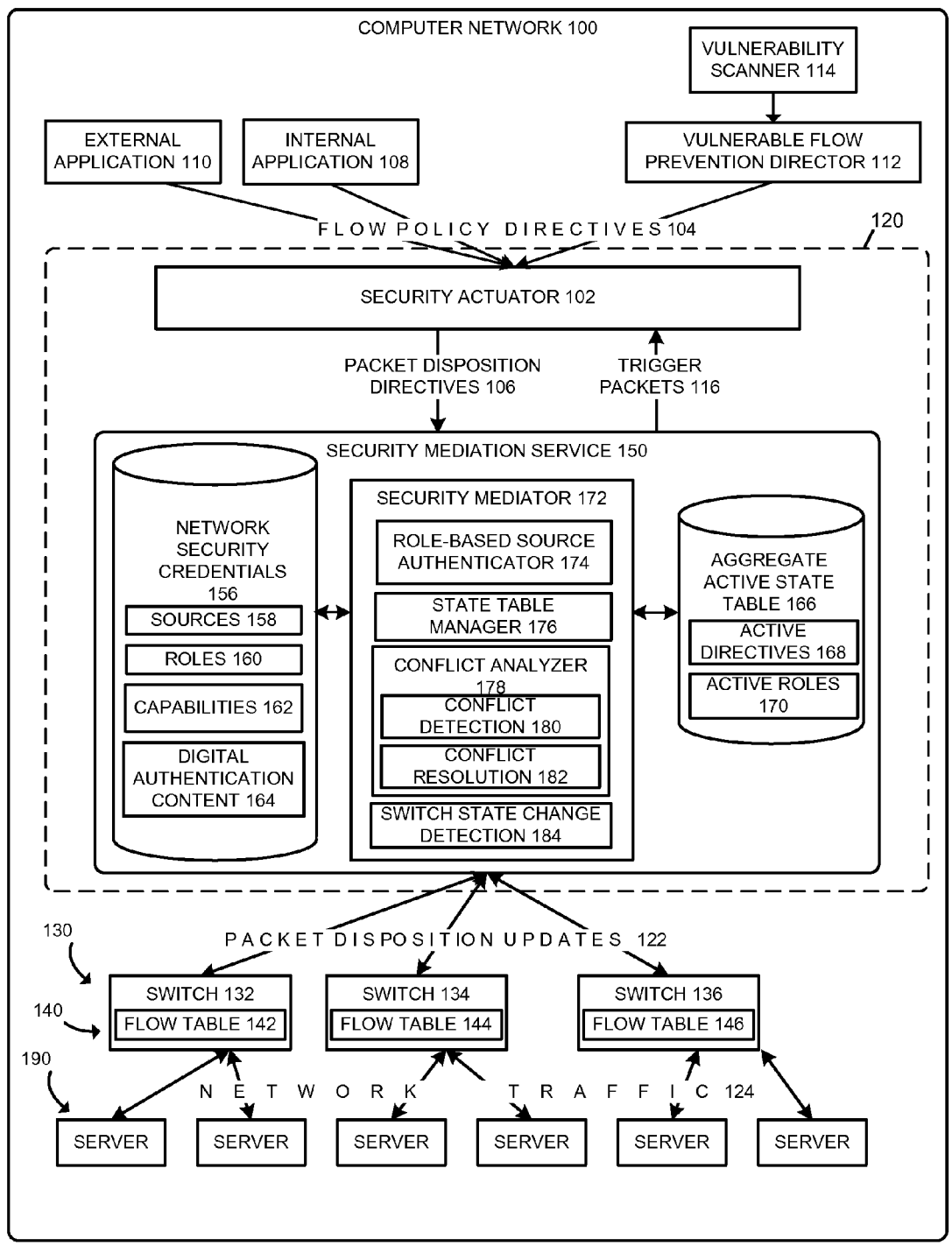
FIG. 1 is a simplified block diagram of at least one embodiment of a dynamically programmable network including a security actuator.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Dynamically programmable networks, some embodiments of which may be referred to as software-defined networks or SDNs, present several new and unique challenges to the effective enforcement of traditional security policies. For instance, many different network flow control applications may be active on a particular SDN. These network applications may attempt to change the network flow control policies dynamically. Further, some network applications may incorporate security vulnerabilities, or may possibly be written by adversaries who wish to use the network application to take control of the network. In some cases, the flow control policies of the various active network applications may potentially conflict, in that some of the flow policies may be contradictory or may attempt to evade or override other flow policies.

For instance, in an evasion scenario referred to herein as dynamic flow tunneling, a network application may seek to evade an existing flow rule by adding a series of flow rules that redirect packets "around" the existing flow rule by modifying the packet header information (using, e.g., a "goto table" directive or "set" action). As an example, in a hypothetical SDN, suppose there are three host computers, one network switch, and one network controller (where a "network controller" in SDN terminology refers to software that acts as an interface between other running software applications, which produce network flows, and the switches or other packet-forwarding devices on the network). Suppose further that a firewall implemented as a network application on the hypothetical SDN has implemented a flow rule that requires the blocking of network packets that specify a particular source Internet Protocol (IP) address and a particular destination IP address. For instance, the firewall's flow rule may require packets from an outside host identified by an address, 10.0.0.2, that are directed to a network service identified as port 80, running on a host identified by an address, 10.0.0.4, to be blocked. Another network application may then attempt to add three new flow rules to be implemented by the network controller as follows. The first proposed rule modifies the source IP address of a packet to 10.0.0.1 if a packet is delivered from 10.0.0.2 to 10.0.0.3 (port 80). The second proposed rule changes the destination IP address of a packet to 10.0.0.4 if a packet is delivered from 10.0.0.1 to 10.0.0.3 (port 80). The third proposed rule simply allows the forwarding of a packet from 10.0.0.1 to 10.0.0.4 at port 80. None of these flow rules, taken individually, conflicts with the firewall's flow rule and thus would be implemented by the network controller, in the absence of security features such as those described herein.

If these proposed flow rules were to be implemented, the firewall's flow rule that blocks packets from 10.0.0.2 to 10.0.0.4 could be evaded. To illustrate this, suppose the host 10.0.0.2 sends a data packet to port 80 of the host 10.0.0.3. This packet can bypass the firewall because it does not directly go to the host 10.0.0.4, but to 10.0.0.3. However, this packet will eventually be delivered to the host 10.0.0.4 by the network controller even if there is a firewall forbidding such traffic, as a result of the second and third proposed flow rules above. In this way, an inadvertently erroneous or malicious network application can evade an existing firewall by simply adding a few flow rules.

These and other challenges can be addressed by implementing a non-bypassable security mediation service on the dynamically programmable network. As disclosed herein, embodiments of the security mediation service can monitor and evaluate flow rule insertion requests and other packet disposition directives (e.g., "packet-outs," "port mods," etc.) against a dynamically-changing security policy, and can do so in "real time," e.g., in response to the directives being produced by the network administrator and/or various software applications running on the network and before the directives are implemented by the network devices (e.g., switches). Embodiments of the security mediation service may enforce and preserve the integrity of the dynamically programmable network's security policy by providing role-based source authentication, conflict detection, conflict resolution, or any combination thereof. Some embodiments of the disclosed security mediation service are also described, for example, in Phillip A. Porras et al., *A Security Enforcement Kernel for OpenFlow Networks*, HotSDN'12, at 121-126 (Aug. 13, 2012); and Phillip A. Porras, *Empowering Dynamic Network Defenses Across OpenFlow Networks*, delivered at the SDN Security Seminars 2012 on Feb. 28, 2012, in San Francisco, Calif., both of which are incorporated herein by this reference. Other materials describing embodiments of the disclosed security mediation service, including video materials by Phillip A. Porras entitled *Inside FortKnox, Security Constraints Enforcement, Reflector Nets*, and *Automated Quarantine*, are posted at http://www.openflowsec.org/ and incorporated herein by this reference. Additionally, Mr. Porras discussed embodiments of the disclosed security mediation service in an interview posted on Jul. 3, 2012 at http://www.sdncentral.com/sdn-blog/phil-porras-openflow-secure-controller/2012/07/(*Interview with Phil Porras: Lack of Secure Controller Hurting OpenFlow?*) and in an interview posted on Feb. 26, 2013 at http://www.sdncentral.com/sdn-blog/sdn-security-oxymoron-phil-porras-sri/2013/02/(*SDN Security—An Oxymoron? New Interview with Phil Porras of SRI International*), both of which are incorporated herein by this reference.

Referring now to FIG. 1, a computer network 100 includes a plurality of computerized modules or components described below. Each of the modules and components shown and described in the figures may be implemented on one or more computing devices as hardware, software, firmware, or a combination thereof. An embodiment of a security actuator module 102 is in communication with a security mediation service 150 of the computer network 100. The illustrative computer network 100 is embodied as a dynamically programmable network, such as an OPEN-FLOW network. As shown by the dashed lines, the security actuator 102 and the security mediation service 150 may embodied in or as a network flow controller 120 of the network 100. In other embodiments, the security actuator 102 and/or the security mediation service 150 may be considered part of a "control plane" of the network 100 but not necessarily part of the controller 120, itself. For instance, the security actuator 102 may be embodied as an internal application 108, described below, which communicates with the controller 120 via, e.g., an application programming interface (API). As an example, using the OPENFLOW framework, the security actuator 102 may communicate with the controller 120 via a northbound API, where, for example, the security actuator 102 contains a client-side northbound API and the controller 120 contains a server-side northbound API. The security actuator 102, the controller 120, or the mediation service 150 may communicate directly with a number of network switches 130 via, e.g., a southbound API of an OPENFLOW network. Alternatively, the security actuator 102 communicates with the network switches 130 indirectly via the controller 120 or the security mediation service 150.

The illustrative dynamically programmable computer network 100 is embodied as a packet-switching digital communications network that is implemented using a software-defined networking approach (such as the OPENFLOW protocol). In some embodiments, the network 100 may correspond to a physical or logical (e.g., virtualized) subset of a larger network, such as a "network slice." As used herein, "packet" may refer to, among other things, a data packet, a network packet, data and/or control communications, or portions of such communications, that are transmitted between devices or otherwise travel on the network 100.

As illustrated in FIG. 1, the network flow controller 120 includes the security actuator 102 and the security mediation service 150, which, among other things, operate to control the network communications between computer applications 108, 110 and one or more network switches 132, 134, 136 on the dynamically programmable network 100. In some embodiments, the security actuator 102 may be included as a component of the security mediation service 150 (e.g., operate in the same process space as other components of the security mediation service 150). For example, the security actuator 102 may communicate directly with a security mediator 172 of the security mediation service 150. Each of the network flow controller 120, the security actuator 102, and the security mediation service 150, and any subcomponents or modules, is implemented as software, firmware, hardware, or a combination thereof.

The network flow controller 120 or portions thereof typically execute in a separate process space from at least the external network applications 110 and are also usually separated from any processes that may be running at the switches 132, 134, 136 (e.g., the "data plane"). For example, in some embodiments, the security mediation service 150 is not implemented as part of a firewall.

The network flow controller 120 may be embodied as a software abstraction of the network control layer (e.g., "control plane") of the network switches 132, 134, 136. For instance, the network flow controller 120 may be implemented as part of or as an extension to an SDN controller, such as an OpenFlow controller. Some vendors of SDN controllers include Big Switch Networks (e.g., the Flood-light OpenSDN controller), HP, IBM, VMWare, and Juniper. In other implementations, the network flow controller 120 may be embodied in a shim layer between a network controller and the network applications 108, 110, or as part of another type of network virtualization layer. One example of a network virtualization layer for an SDN (and OpenFlow, specifically) is FlowVisor, developed by Stanford University, Deutsch Telecom, Inc., and Nicira Networks. In any case, the network flow controller 120 may execute on one or more computing devices (e.g., servers), separately from the network switches 132, 134, 136 and/or separately from other computing devices on which the applications 108, 110 may be running.

The security actuator 102, the network flow controller 120, and/or the security mediation service 150 may be connected to each of the switches 132, 134, 136 using, e.g., a dedicated control connection. The network switches 132, 134, 136 each may be embodied as, for example, a switch, a router, a load balancer, a learning switch, or another type of network device. The switches 132, 134, 136 each communicate with one or more servers 190 to effectuate the flow of network traffic 124 across the network 100 in accordance with a network security policy. As used herein, terms such as "network traffic" and "network flow" refer to, in the context of the network 100, sequences of data packets from a source computer to a destination, where the destination may be, for example, another host, a multicast group, or a broadcast domain. In some cases, network flow may refer to a logical equivalent of a call or a connection. A network flow may include all of the data packets in a specific transport connection or media stream. However, a network flow need not be directly mapped to a transport connection. A network flow can also be thought of as a set of data packets that pass an observation point in the network during a certain time interval.

The security policy for the dynamically programmable network 100 may be established by, for example, a network administrator and may be implemented as, e.g., a data file, database, table, or other suitable computerized data structure. As used herein, the term "network administrator" may refer to, for example, a human operator, a network security software application, and/or a computerized agent or delegate of a human operator, such as a software application that acts under the direction of or in response to inputs from the human operator. The security policy may be implemented at the switches 132, 134, 136 as a number of network flow rules, which are maintained at the switches 132, 134, 136 in local flow tables 142, 144, 146. The local flow tables 142, 144, 146 are used by their respective switches 132, 134, 136 to instantiate flow rules at the switch and direct the network traffic 124 between the servers 190. Each of the switches 132, 134, 136 updates its respective local flow table 142, 144, 146 in accordance with the packet disposition updates 122. In some embodiments, the switches 132, 134, 136 may communicate changes in the local flow tables 140 back to the security mediation service 150. For simplicity, the illustrative network 100 is shown with three network switches 132, 134, 136 having local flow tables 142, 144, 146, respectively; however, the network 100 may include any number of switches 132, 134, 136.

Each of the servers 190 may be embodied as any suitable type of computing resource, e.g., a server computer, group of server computers, or one or more other devices that are configured to communicate with the switches 132, 134, 136 to send and receive data packets over the network 100. For simplicity, the illustrative network 100 is shown with a fixed number of servers 190 per switch 130; however, the network 100 may include any number of servers 190 in communication with any number of switches 130.

The network applications 108, 110 may each be embodied as any software, firmware, hardware, or combination thereof that controls, defines, or otherwise interacts with the dynamically programmable network 100. For instance, the network applications 108, 110 may include network security applications and/or other types of software applications running on the network 100. Each of the network applications 108, 110 may produce one or more flow policy directives 104 that are received by the security actuator 102.

The illustrative internal network application 108 is embodied as a network software application that executes in the same process space as the security actuator 102. For example, the internal network application 108 may be embodied as a loadable module executing within the same operating system process as the security actuator 102. As another example, the internal network application 108 may be embodied as a bytecode module loaded from the same archive as the security actuator 102.

The illustrative external network application 110 is embodied as a network software application that executes outside of the process space of the security actuator 102, or even outside the process space of the network flow controller 120. For example, the external network application 110 may be embodied as a separate operating system process executing on the same computing device as the network flow controller 120 or on a remote computing device. As a separate operating system process, the external network application 110 may execute from a separate, non-privileged account. In other embodiments, the external network application 110 may be embodied as a Python OpenFlow application that communicates with the security actuator 102 through a Python Simplified Wrapper and interface Generator (SWIG).

The illustrative network 100 further includes a vulnerable flow prevention director 112 and a vulnerability scanner 114. The vulnerability scanner 114 may be embodied as software, firmware, hardware, or a combination thereof, e.g., any vulnerability scanner, service, or other process than scans the network 100 for applications or services containing known vulnerabilities. The vulnerability scanner 114 may produce, for example, a collection of vulnerable host/port information. The vulnerability scanner 114 may be embodied as a third-party or legacy application that is unaware of the dynamic programmability of the network 100. The vulnerable flow prevention director 112 periodically causes the vulnerability scanner 114 to scan the network 100, and based on the output generated by the vulnerability scanner 114, submits flow policy directives 104 to the security actuator 102. The vulnerable flow prevention director 112 may, for example, generate flow policy directives 104 to redirect external visitors away from a vulnerable host/port combination while continuing to allow internal access to the vulnerable host/port, redirect all traffic away from the vulnerable host/port combination, or implement any other desired network flow policy. The vulnerable flow prevention director 112 is illustrated as an internal network application 108; however, the vulnerable flow prevention director 112 may be embodied as an external network application 110 or any other type of application capable of interfacing with the security actuator 102.

For simplicity, only three illustrative network applications are shown in FIG. 1. However, the network 100 may include any number of external and/or internal network applications 108, 110, or other types of software applications. For example, the network 100 may include a network-based botnet detection application such as BotHunter (www.bothunter.net), a contextual flow policy enforcement application, or any other network security application that can communicate with the network flow controller 120 (e.g., via the security actuator 102). The botnet detection application may be embodied as a method and apparatus for detecting malware infection as described in United States Patent Application Publication No. 2009/0172815, which is incorporated herein by this reference in its entirety.

As used herein, "computer application" or "application" may refer to, among other things, any type of computer program or computer-readable instructions, whether implemented in software, hardware, or a combination thereof, and includes, for example, operating system programs, middleware (e.g., APIs, runtime libraries, utilities, etc.), self-contained software applications, or a combination of any of the foregoing.

The security actuator 102 is embodied as software, firmware, hardware, or a combination thereof. The security actuator 102 is configured to convert flow policy directives 104 received from the network applications 108, 110 into packet disposition directives 106 that may be submitted to the security mediation service 150. For example, the security actuator 102 may receive high-level threat-mitigation directives expressed in the flow policy directives 104 and translate or convert those high-level directives into lower-level packet disposition directives 106. As used herein, "higher-level" and "lower-level" may refer to, among other things, relative degrees of abstraction, where higher-level may refer to directives that include human-intelligible text and lower-level may refer to directives that are machine-intelligible codes, and may or may not include human-intelligible text. The illustrative policy directives 104 and packet disposition directives 106 are embodied as data communications embodying instructions, and are transmitted over the network 100.

In some embodiments, the security actuator 102 implements the high-level flow policy directives 104 using a mechanism that may be referred to herein as a flow modification rule or packet disposition directive 106. As described in more detail below, there are many different types of flow modification rules. Some flow modification rules allow for the security actuator 102 or the network flow controller 120, for example, to instruct a network switch to automatically direct a packet to a specified switch-port. Some flow modification rules permit the switch to rewrite portions of the header information of the packet (e.g., the link-layer or IPv4 header). Some flow modification rules cause a packet to be redirected (e.g., to the security actuator 102 or to the network flow controller 120) for further processing. Such "trigger" flow modification rules allow the security actuator 102 to receive packets from the network traffic; i.e., packets that are targeted by the flow policy directive 104, and based on the receipt of such packets trigger a response packet (such as a TCP connection reset) or trigger the insertion at the switch of flow-modification rules that are specific to that particular network traffic (e.g., a "redirect"). As such, a single flow policy directive 104 can result in the insertion of multiple different flow modification rules by the security actuator 102 at one or more of the network switches 130.

The packet disposition directives 106 may include a number of trigger rules, which cause the network switches 132, 134, 136 to forward matching trigger packets 116 back to the security actuator 102 for further analysis, and may cause the security actuator 102 to create additional packet disposition directives 106. For example, a trigger rule may initiate or be embodied as an automated mechanism, such as a "stateful" rule that spawns an automated mechanism or "automata" that communicates with one or more of the network switches 130 after the trigger rule is implemented, in order to monitor network communications to and from the switches 130 and determine whether a corresponding flow policy directive 104 (e.g., expressed as packet disposition directives 106) should be enforced with respect to any of the monitored communications. In that sense, the security actuator 102 can initiate an automated mechanism that can cause, e.g., flow modification rules, to persist for longer than the lifespan of the security actuator 102, itself. In some examples, the security actuator 102 or an automated mechanism that it spawns "listens" to network communications over a period of time, monitoring for packet that match the criteria of a currently active flow rule. When a packet is discovered that matches a flow rule criterion (e.g., expressed as one or more packet disposition directives 106), the security actuator 102 or its spawned automated mechanism communicates, either directly or through the controller 120 or security mediation service 150, with the network switches 130 to enforce the flow rule (by, e.g., blocking, quarantining, or re-directing the communication).

As further described below, the security actuator 102 may resolve higher-level or application-specific directives using a pre-defined set of flow policy directives 104, which may include, for example, "block," "deny," "allow," "redirect," "quarantine," "undo," "constrain," and/or "info" directives. A "block" flow policy directive 104 may, for example, implement a full duplex filter between a Classless Inter-Domain Routing (CIDR) block and the internal network, where the primary use for this command is in blacklist enforcement. As a result of a block directive, a packet may be dropped or otherwise prevented from reaching its destination. The deny, allow, undo, and info flow policy directives 104 may be similar to their firewall counterparts and can be capable of being refined down to an individual flow rule. A "redirect" flow policy directive 104 may, for example, enable a network application 108, 110 to tunnel all flows between a source and given target to a new target (e.g., a honeypot or honeynet). With a flow policy directive 104, a switch 132, 134, 136 may rewrite the packet headers of all applicable network flows such that a source cannot tell that its flows have been redirected to the new target. One application of the "redirect" flow policy directive 104 includes the redirection of a malicious scanner into a honeynet. A "quarantine" flow policy directive 104 may enable a network application 108, 110 to essentially isolate an internal host from the network. A "constrain" flow policy directive 104 may enable a network application 108, 110 to deactivate all current flow rules in the switches 132, 134, 136 that are not set to a specified priority (e.g., flow rules that are non-privileged).

The security mediation service 150 includes a security mediator 172, which receives packet disposition directives 106 from the security actuator 102 in a non-bypassable manner. That is, the illustrative security mediator 172 is implemented between the security actuator 102 and the network switches 132, 134, 136, so that all packet disposition directives 106 pass through or are intercepted by the security mediator 172 before being implemented by the switches 132, 134, 136. The security mediator 172 evaluates the packet disposition directives 106 based on the then-current network security policy, as described in more detail below. After a packet disposition directive 106 has been evaluated by the security mediator 172, the security mediation service 150 may communicate a corresponding packet disposition update 122 to one or more of the network switches 132, 134, 136 or to the security actuator 102. Each of the security mediator 172, the security mediation service 150, and any subcomponents may be embodied as software, firmware, hardware, or a combination thereof.

As used herein, a "packet disposition directive" may refer to, among other things, flow rules or any computer logic that determines or results in the disposition of one or more data packets by the switches 132, 134, 136 on the dynamically programmable network 100, or that changes the switches' behavior or configuration in any way. Some examples of potential packet dispositions include "forward" (in which a data packet is sent on to its next, intermediate or final, destination), "drop" (in which a switch deliberately does not send a data packet on to its next destination, because, for example, the switch's capacity is overloaded or the switch believes that the packet is part of a denial-of-service attack), and "modify" (in which information in the packet header is modified by the directive). Thus, packet disposition directives 106 can include flow rule insertion requests as well as other types of communications that result in a packet disposition without specifying a flow rule, such as "packet-outs" and "port mods." A packet-out refers, generally, to a packet disposition directive 106 that may request one or more of the switches 132, 134, 136 to generate network traffic 124 in response to a specified network condition. A port mod refers, generally, to a packet disposition directive 106 that can enable or disable a network service such as a port of a network switch 130. Packet disposition directives 106 can be produced by, for example, the network administrator and/or by any one or more of the network applications 108, 110. The packet disposition directives 106 may conform to or extend a software-defined network protocol implemented by the network flow controller 120. For example, in some embodiments, the packet disposition directives 106 may be OpenFlow messages. In some embodiments, the packet disposition directives 106 may directly correspond to flow rules that can be directly instantiated at the network switches 132, 134, 136.

As used herein, a "flow modification rule" or "flow rule" may refer to, among other things, packet disposition directives 106 that contain logic that, if executed at the network switches 132, 134, 136, do control the flow of data packets across the network 100. Thus, the set of all flow rules instantiated on the dynamically programmable network 100 embodies a current implementation of the network security policy. However, in the dynamically programmable network 100, flow rules, and thus, the network security policy, can be modified "on the fly" by the packet disposition directives 106. Thus, as used herein, "dynamically" may refer to, among other things, a network in which the flow rules, and thus the security policy, may be constantly varying or changing in response to, for example, the then-current network conditions. As used herein, terms such as "currently active flow rules" or "currently active directives" refer generally to the set of flow rules and/or other packet disposition directives that, at a particular moment in time during the operation of the network 100, represents the then-current network security policy. As used herein, terms such as "candidate flow rule" or "candidate directive" may refer to, among other things, any flow rule or other packet disposition directive that is not currently part of the set of currently active directives. In other words, "candidate flow rules" may refer to flow rules that have not yet been evaluated by the security mediator 172, are currently being evaluated by the security mediator 172, or that have been evaluated but rejected by the security mediator 172.

To simplify the discussion, flow rules are referred to herein as having two main parts: match criteria and actions. The match criteria determine whether a flow rule applies to a particular data packet. The match criteria include a number of match fields, including those that specify source and destination criteria for matching data packets to the flow rule. The source and destination match fields each identify particular computing resources by any suitable references or network service identifiers, such as IP addresses, network masks, ports, and/or others. In some embodiments, match fields other than source and destination may be used to evaluate the applicability of a flow rule to a data packet, and in some embodiments, one match criterion or multiple match criteria may be used.

A flow rule may contain one or more actions. The action(s) contained in the flow rule specify what action(s) are to be taken by a network switch if the flow rule applies to a particular data packet; that is, if the values of the match fields of the flow rule match the values of the corresponding match fields in the header of the data packet. An action may specify a disposition for the data packet, for example, to drop, forward, or modify the data packet. Some flow rules may specify that the data packet's header information is to be modified or rewritten, e.g., using a "set" action (in OpenFlow terminology), if the flow rule applies to the packet. Some flow rules may specify that the data packet is to be forwarded to the network controller for further analysis.

Referring now in more detail to the security mediation service 150 of FIG. 1, the security mediation service 150 validates the sources of the packet disposition directives 106, analyzes the packet disposition directives 106 for conflicts with existing flow rules, and performs role-based conflict resolution. The security mediation service 150 detects and resolves conflicts quickly, allowing for real-time or near-real time control of the network flow rules. The illustrative security mediation service 150 is embodied as a number of computerized modules and data structures (e.g., software, firmware, hardware, or a combination thereof) including a network security credentials table 156, an aggregate active state table 166, and a security mediator 172. Such computerized modules and data structures may execute or be resident on the same computing device or group of computing devices as the network flow controller 120, and/or on one or more other computing devices that are connected to the network 100.

To receive packet disposition directives 106 from the security actuator 102, the security mediation service 150 may include one or more network communication interfaces. For example, packet disposition directives 106 may be received from the security actuator 102 using a defined application programming interface (API), such as a northbound API of the network flow controller 120 and/or the security mediation service 150. Packet disposition directives 106 may be received from the security actuator 102 using an inter-process communication mechanism such as pipes, sockets, or the like. For example, packet disposition directives 106 may be received through a secure sockets layer (SSL) communication from the security actuator 102.

The security mediator 172 interfaces with the network security credentials table 156 to validate the sources or "producers" of packet disposition directives 106, and interfaces with the aggregate active state table 166 to maintain the current status of the network security policy as implemented as the set of currently active packet disposition directives. The network security credentials table 156 maintains a trust model for the security mediation service 150, which associates the various sources of packet disposition directives 106 with one or more security roles, packet disposition capabilities, and digital authentication content. As such, the network security credentials table 156 includes data relating to the sources 158, security roles 160, capabilities 162, and digital authentication content 164. The sources 158 may identify particular users, e.g., network administrators, or particular network applications 108, 110, which may submit packet disposition directives 106. The sources 158 may also be referred to by terminology such as "flow rule producers" or "rule insertion requestors." The security roles 160 define particular security roles that may be assigned to the sources 158. Each role 160 has an associated priority, which is used by the security mediation service 150 to resolve flow rule conflicts. In some embodiments, one or more of the roles 160 may be extended with sub-roles according to the requirements of a particular design of the security mediation service 150. In some embodiments, the security roles 160 may include a number of pre-defined roles, e.g.: network administrators, security-related network applications 108, 110, and non-security-related applications 108, 110. For example, in some embodiments, the security role 160 associated with network administrators may be assigned the highest priority. The security role 160 associated with security-related network applications 108, 110 may be assigned an intermediate priority that is lower than the administrator's priority but higher than the priority of other applications. For instance, network security applications may produce flow rules that further constrain the network adminstrator's static network security policy, based on newly perceived runtime threats or other current network conditions. The lowest-priority security role 160 may be assigned to sources 158 that are non-security-related network applications 108, 110, or that are unidentified (e.g., not digitally authenticated), or that are without an assigned role 160. Each of the roles 160 may be associated with one or more of the capabilities 162. The capabilities 162 define the operations that sources 158 are permitted to perform on the network 100; for example, the capabilities may include the ability to create, modify, or delete flow rules, the ability to create packet-outs, the ability to perform port mods, and the like. The capabilities 162 may be associated with particular roles 160, in some embodiments. As an example, in accordance with the network security credentials 156, a source 158 may be associated with a role 160, and based on the role 160 and/or the digital authentication content 164 associated with the source 158, the source 158 may have certain limited or expanded capabilities 162. The source 158's role 160 and/or capabilities 162 may be determined based at least in part on whether the source 158 has associated digital authentication content 164. For example, in some embodiments, whether a source 158 has capabilities 162 that include the ability to create packet-outs or perform port mods may depend upon whether the source 158's identity has been successfully authenticated. When a packet disposition directive 106 is evaluated by the security mediation service 150, the security mediation service 150 considers the role 160 and/or capabilities 162 associated with the source 158 of the packet disposition directive 106.

The digital authentication content 164 stores information needed to identify and authenticate the sources 158. For example, the digital authentication content 164 may store a public key from a digital certificate associated with each source 158. For network applications 108, 110, the digital authentication content 164 may include an authentication tuple appropriate for the particular network application. For example, an external network application 110 may be identified by an SSL credential, an identity credential, and an SSL connection. In another example, an embedded network application 108 may be identified by a digital certificate and a digitally signed bytecode module.

The aggregate active state table 166 tracks the current state of the security policy on the network 100, as embodied in the set of currently active packet disposition directives 168, as it changes over time during the operation of the network. The aggregate active state table 166 thus stores data relating to the active directives 168, which represent all of the currently accepted packet disposition directives 106 in the dynamically programmable network 100 at any given moment in time. The aggregate active state table 166 also stores data relating to the currently active roles 170, which reference the security roles 160 associated with each of the currently active directives 168. Additionally, the aggregate active state table 166 maintains data relating to the current state of each of the local flow tables 140 of the switches 132, 134, 136 as it changes over time during the operation of the network 100.

The data relating to the active directives 168 may include, for each of the currently active directives 168 that includes a flow rule, a representation of the flow rule that is referred to herein as an alias set reduced format, or "alias set reduced rules." The alias set reduced rules each include an expansion of the flow rule that makes explicit any field substitutions that would result from the application of the flow rule to a data packet to which the rule applies. In a simplified example, each alias set reduced rule includes a representation of the active flow rule itself, a source alias set, a destination alias set, an associated security role 160, and a disposition (e.g., drop, forward, modify, etc.). The source and destination alias sets are expanded representations of the source and destination match fields of the flow rule, respectively, which incorporate, for example, "set" action transformations and wildcards.

The alias sets initially include the values of the source and destination criteria (e.g., IP addresses, network masks, ports, etc.) specified in the match fields of the flow rule. If the rule's action allows another value to be substituted for the initial value of a match field, using, e.g., a "set" action, the resulting value or values are added to the associated alias set. Alias set expansion may continue for related, subsequent flow rules. The initial alias sets for each subsequent flow rule are created for the source and destination match fields as above. These alias sets are then compared to the alias sets of the previous rule. If an alias set intersects with the alias set of the previous rule, the union of the alias sets is used as the alias set for the subsequent rule. As used herein, "intersect" connotes, as in mathematics, the generation of a set that contains all elements of a set A that also belong to another set B (or equivalently, all elements of B that also belong to A), but no other elements. As used herein, "union" connotes, as in mathematics, the generation of a set that contains all elements of a set A and all elements of another set B, but no duplicates. Such expansion is performed for all of the currently active flow rules and stored in the aggregate active state table 166.

For example, Table 1 below illustrates a set of three related flow rules and their associated alias sets. Flow rule 1 matches packets with source a and destination c, and includes an action to set a to a'. Thus, for rule 1, the source alias set is (a, a') and the destination alias set is (c). Rule 2 matches packets with source a' to destination c and includes an action to set c to b. The source alias set for rule 2 is initially (a'), which intersects with the source alias set for rule 1. Thus, the source alias set for rule 2 is (a, a'), the union of the source alias sets of rules 1 and 2. Based on the set action, the destination alias set for rule 2 is (c, b). Lastly, rule 3 matches packets with source a' to destination b and includes an action to forward the data packet. The initial source and destination alias sets are (a') and (b), respectively. These alias sets intersect with the alias sets of rule 2, so the final alias sets of rule 3 are (a, a') and (c, b).

TABLE 1

Flow rules and alias sets.

| # | Rule | Source Alias Set | Destination Alias Set |
|---|---|---|---|
| 1 | a → c (set a⇒ a') | (a, a') | (c) |
| 2 | a' → c (set c⇒ b) | (a, a') | (c, b) |
| 3 | a' → b forward packet | (a, a') | (c, b) |

Referring now in more detail to the security mediator 172 of FIG. 1, the security mediator 172 receives the packet disposition directives 106 from the security actuator 102 and analyzes each of the packet disposition directives 106 to detect and resolve conflicts with the then-current security policy as expressed by the active directives 168. Acceptable packet disposition directives 106 are added to the active directives 168 and implemented on the switches 132, 134, 136. The illustrative security mediator 172 is embodied as a number of computerized modules and data structures including a role-based source authenticator 174, a state table manager 176, a conflict analyzer 178, and a switch state change detection module 184.

The role-based source authenticator 174 identifies and authenticates the source 158 associated with the packet disposition directive 106 and associates the source 158's role 160 with the packet disposition directive 106. To perform such authentication and validation, the role-based source authenticator 174 may reference the network security credentials table 156.

The state table manager 176 manages and maintains the current state of the aggregate active state table 166 and/or the network security credentials table 156 as flow rules and/or other directives are added, modified, and deleted from the set of currently active directives. The state table manager 176 may operate in conjunction with the switch state change detection module 184, so that the aggregate active state table 166 remains synchronized with the local flow tables 142, 144, 146 at the network switches 132, 134, 136.

The conflict analyzer 178 determines, "live"—that is, when a packet disposition directive 106 is received at the security mediator 172—whether to instantiate a packet disposition directive 106 based on its associated role 160. For packet disposition directives 106 containing flow rule insertion requests (e.g., candidate flow rules), the conflict analyzer 178 may compare each candidate flow rule to the set of existing active directives 168. Such comparison may detect one or more rule conflicts, including rule conflicts involving dynamic flow tunneling. As used herein, a "rule conflict" arises when a candidate flow rule seeks to enable a network flow that is otherwise prohibited by the existing currently active directives 168, or a candidate flow rule seeks to disable a network flow that is otherwise allowed by the existing currently active directives 168. For example, conflicts can include contradictory or inconsistent rules. Any conflicts between candidate flow rules and existing active directives 168 are resolved in accordance with the network security policy. In some embodiments, conflict detection and conflict resolution may be performed by sub-modules of the conflict analyzer 178, for example by a conflict detection module 180 and/or a conflict resolution module 182.

The switch state change detection module 184 communicates messages received from the switches 132, 134, 136 relating to the status of the local flow tables 140 of each switch 130. In particular, the switch state change detection module 184 may provide an interface by which the aggregate active state table 166 is updated when any the switches 132, 134, 136 perform rule expiration. In some embodiments, the switch state change detection module 184 may implement a callback routine to receive messages from the switches 132, 134, 136 and coordinate the state of the switches 132, 134, 136 with the aggregate active state table 166. For example, a switch 130 may reject or refuse flow rule updates when resources of the switch 132, 134, 136, such as the local flow tables 142, 144, 146 are exhausted. In such event, the switch 130 may send a message to the switch state change detection module 184 signaling such rejection. In other embodiments, a switch 130 may delete a flow rule based on the expiration of a defined amount of time (e.g., a "timeout") and send a message signaling the deletion to the switch state change detection module 184. The switch state change detection module 184 receives such messages and updates the aggregate active state table 166 accordingly.

Figure 2:
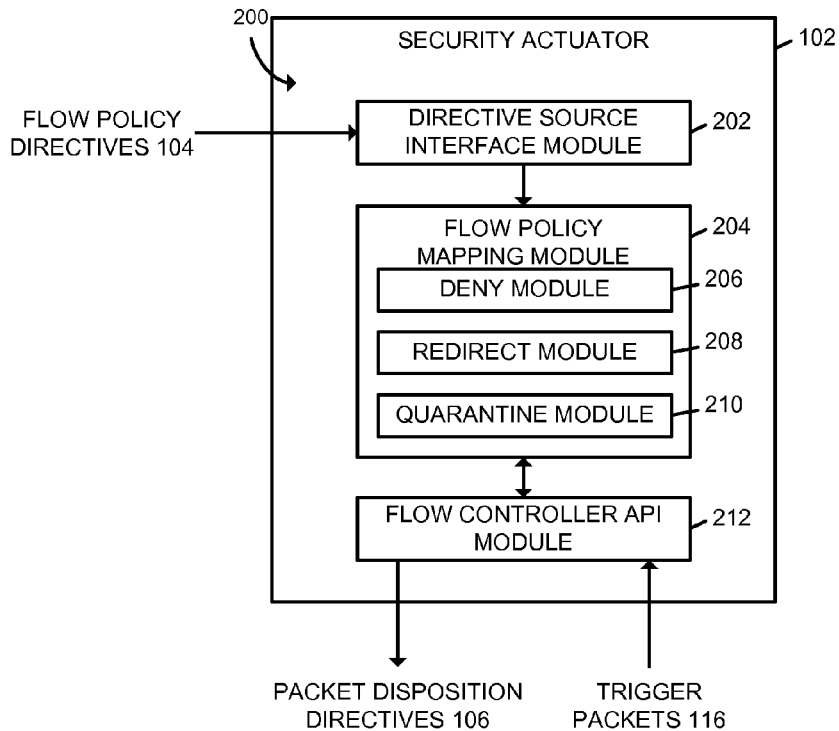
FIG. 2 is a simplified block diagram of at least one embodiment of an environment that may be established by the security actuator of FIG. 1.

Referring now to FIG. 2, in the illustrative embodiment, the security actuator 102 establishes an environment 200 during operation (e.g., an execution or "runtime" environment). The illustrative environment 200 includes a directive source interface module 202, a flow policy mapping module 204, and a flow controller API module 212. The various modules of the environment 200 may be embodied as hardware, firmware, software, or a combination thereof.

The directive source interface module 202 is configured to receive flow policy directives 104 from one or more flow policy directive sources, such as the network applications 108, 110, 112. As described further below, the flow policy directives 104 may be embodied as relatively high-level expressions of desired network security policies. For example, the flow policy directives 104 may include deny directives, redirect directives, quarantine directives, or other directives to modify flow of data through the switches 130 of the network 100.

The flow policy mapping module 204 is configured to translate the flow policy directives 104 into one or more packet disposition directives 106. The packet disposition directives 106 can directly cause the switches 130 to implement the flow policy directive 104 but the flow policy directives 104 cannot be directly implemented by the switches 130. The particular packet disposition directives 106 generated may depend on the received flow policy directives 104. As discussed above, the packet disposition directives 106 may include flow modification rules to control flow of communications across the network 100, or trigger rules that cause the switches 130 to forward matching data packets to the security actuator 102 for further analysis. The flow policy mapping module 204 may be further configured to generate one or more additional packet disposition directives 106 based on data forwarded in response to matching the trigger rules. In some embodiments, those functions may be performed by sub-modules, for example by a deny module 206, a redirect module 208, or by a quarantine module 210.

The flow controller API module 212 is configured to transmit the packet disposition directives 106, which are created by the security actuator 102 as translations of flow policy directives 104, to the security mediation service 150. As described above, the security mediation service 150 may then add the packet disposition directives 106 to the active flow rules of the network 100 based on a comparison of the packet disposition directives 106 to the set of existing, currently active flow rues (e.g., the packet disposition directives 106 may be implemented as flow rules if the packet disposition directives 106 do not conflict with the existing, currently active flow rules). The flow controller API module 212 may use any method to communicate with the security mediation service 150, including through a northbound API of the network flow controller 120 and/or the security mediation service 150. The flow controller API module 212 is also configured to receive trigger packets 116 that have been forwarded from the switches 130 of the network 100. The flow controller API module 212 may use any method to receive those packets, including a southbound API of the network flow controller 120 and/or the security mediation service 150, registering callback functions, or other method. The flow controller API module 212 may receive the trigger packets 116 indirectly via the security mediation service 150 and/or the network flow controller 120 or directly from the switches 130.

Figure 3:
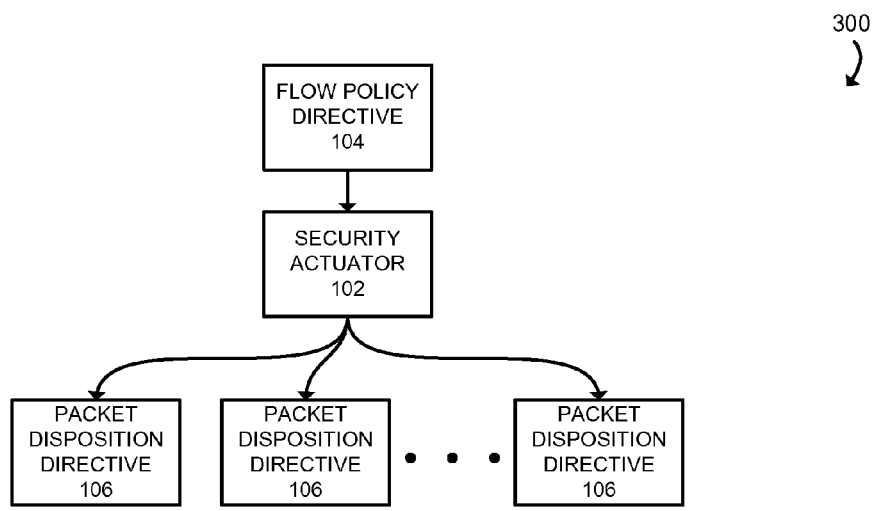
FIG. 3 is a schematic diagram illustrating one embodiment of a method by which the security actuator of FIGS. 1 and 2 may actuate flow policy directives in the dynamically programmable network.

Referring now to FIG. 3, schematic diagram 300 illustrates operation of the security actuator 102. In use, as described further below, the security actuator 102 may receive a flow policy directive 104 and then convert that flow policy directive 104 into a number of packet disposition directives 106. Those packet disposition directives 106 are then installed in the switches 130 of the network 100 to control the dynamic behavior of the network 100. The security actuator 102 further tracks and manages those packet disposition directives 106 over the lifetime of the flow policy directive 104.

Figure 4:
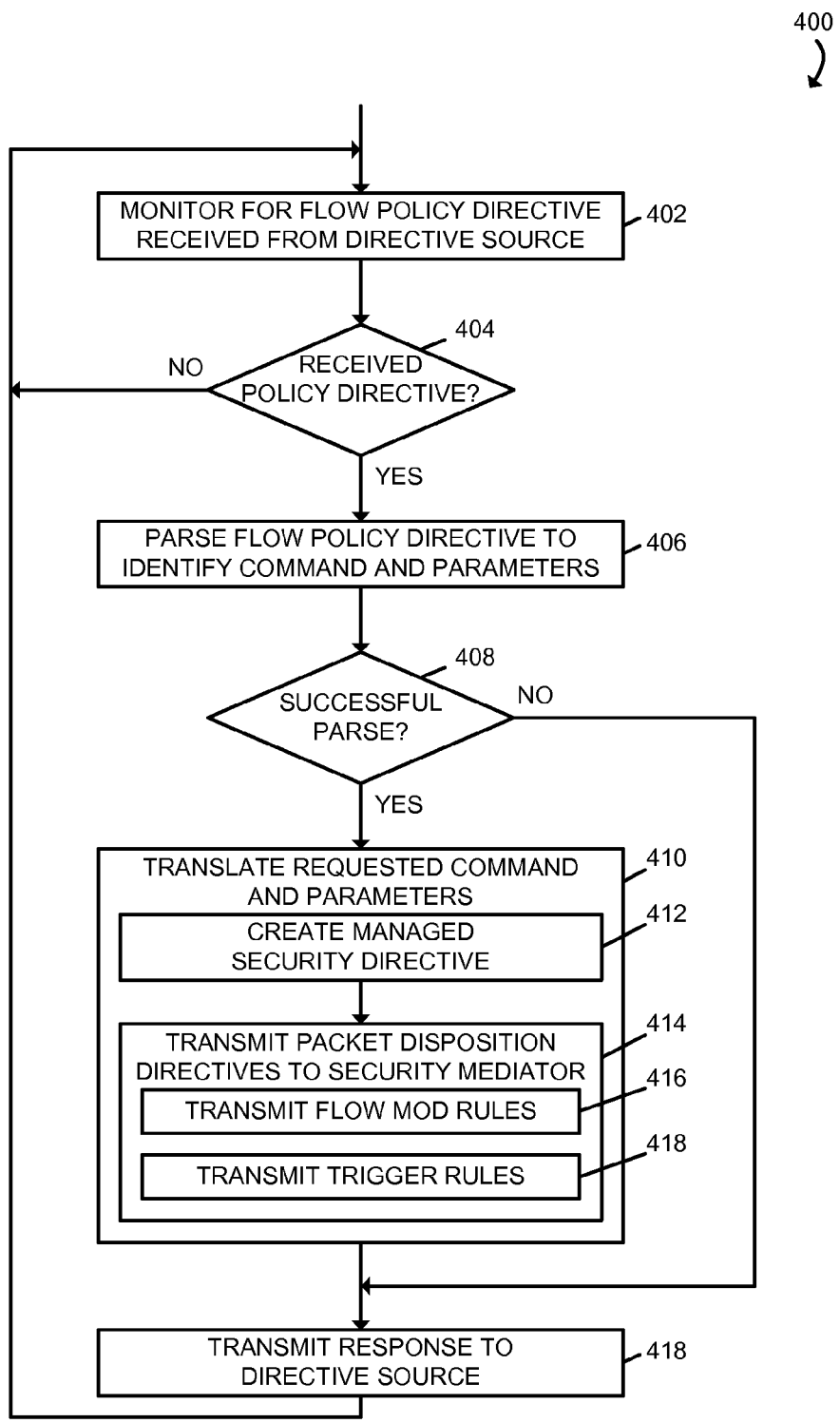
FIG. 4 is a simplified flow diagram of at least one embodiment of a method by which the security actuator of FIGS. 1 and 2 may actuate flow policy directives in the dynamically programmable network.

Referring now to FIG. 4, an illustrative method 400 for processing flow policy directives 104 by the security actuator 102 is shown. The method 400 may be embodied as computerized programs, routines, logic, and/or instructions of a computing system, e.g., as part of the security actuator 102, for example. The method 400 begins in block 402, in which the security actuator 102 monitors for a flow policy directive 104 received from a directive source such as the network applications 108, 110. The security actuator 102 may listen on a network socket, establish an application programming interface (API), or establish some other communication interface to receive flow policy directives 104 from the network applications 108, 110. In block 404, the security actuator 102 determines whether a flow policy directive 104 has been received. If not, the method 400 loops back to block 402 to continue monitoring for flow policy directives 104. If a flow policy directive 104 was received, the method 400 advances to block 406.

In block 406, the security actuator 102 parses the flow policy directive 104 to identify a command and any associated parameters contained in the flow policy directive 104. Each flow policy directive 104 may be embodied as a command and any number of parameters. For example, the flow policy directive 104 may be embodied as a whitespace-delimited text string beginning with a command and continuing with an optional list of parameters. The security actuator 102 may parse the flow policy directive 104 to validate the requested command, check for required parameters, or otherwise prepare the flow policy directive 104 for processing. For example, valid commands may include network security directives such as BLOCK, DENY, REDIRECT, QUARANTINE, and UNPLUG as well as management directives such as ADJUST, CANCEL, DEFAULTS, HELP, HOSTINFO, INFO, SHUTDOWN, SWITCHES, and QUIT.

In block 408, the security actuator 102 determines whether the flow policy directive 104 was successfully parsed. If not, the method 400 branches ahead to block 418, in which the security actuator 102 may report an error as described below. If the flow policy directive 104 was successfully parsed, the method 400 advances to block 410.

In block 410, the security actuator 102 translates the requested command and parameters into a number of packet disposition directives 106. In block 412, the security actuator 102 creates a managed security directive corresponding to the flow policy directive 104. The illustrative security actuator 102 can use managed security directives to diagnose and manage the operations of the security actuator 102 and its active network security directives (e.g., the currently active flow rules). For example, managed security directives can adjust a time-out of a packet disposition directive 106, remove a currently active packet disposition directive 106, generate a list of active packet disposition directives 106, shut down the security actuator 102, or disconnect a flow policy directive source. A managed security directive may be used by the security actuator 102 to install, remove, and otherwise manage the packet disposition directives 106 associated with the flow policy directive 104 (e.g., where there are multiple packet disposition directives 106 needed to implement the flow policy directive 104). For example, the security actuator 102 may provide the flow policy directive source with a unique directive identifier for use with future commands.

In block 414, the security actuator 102 transmits the packet disposition directives 106 to the security mediation service 150. The packet disposition directives 106, when installed in the network 100, cause the switches 130 of the network 100 to implement the flow policy directive 104 to control network flows, e.g., the flow of data across the network 100. The particular packet disposition directives 106 transmitted depends on the flow policy directive 104 to be implemented, as described further below. The security actuator 102 may communicate the packet disposition directives 106 to the security mediation service 150 using any appropriate technique or protocol. For example, the security actuator 102 may communicate the packet disposition directives 106 using a northbound API of the flow controller 120 and/or security mediation service 150.

In block 416, in some embodiments the security actuator 102 transmits one or more flow modification rules to the security mediation service 150. The flow modification rules control flow of communications across the network 100. For example, the flow modification rules may direct one of the switches 132, 134, 136 to direct particular matching packets to a specified port of the switch, or to rewrite particular elements of the data packet header (e.g., the link-layer header or some elements of the IPv4 header). In block 418, in some embodiments the security actuator 102 may transmit one or more trigger rules to the security mediation service 150. The trigger rules cause the switches 130 to forward particular matching packets (illustrated as trigger packets 116) to the security actuator 102. For example, a trigger rule may direct one of the switches 132, 134, 136 to direct particular matching packets to the network controller (i.e., via the security mediation service 150), which in turn forwards the packets to the security actuator 102.

After translating the flow policy directive 104 into one or more packet disposition directives 106, in block 418 the security actuator 102 transmits a response to the source of the flow policy directive 104. The response may indicate that the flow policy directive 104 was implemented successfully or that an error occurred. The response may include additional information, such as an identifier of any managed security directive created by the security actuator 102, results of implementing the flow policy directive 104, or an error message. The response may be embodied as any appropriate data format, including as a whitespace-delimited line of text. After transmitting the response, the method 400 loops back to block 402 to monitor for additional flow policy directives 104.

Handling Trigger Packets

Figure 5:
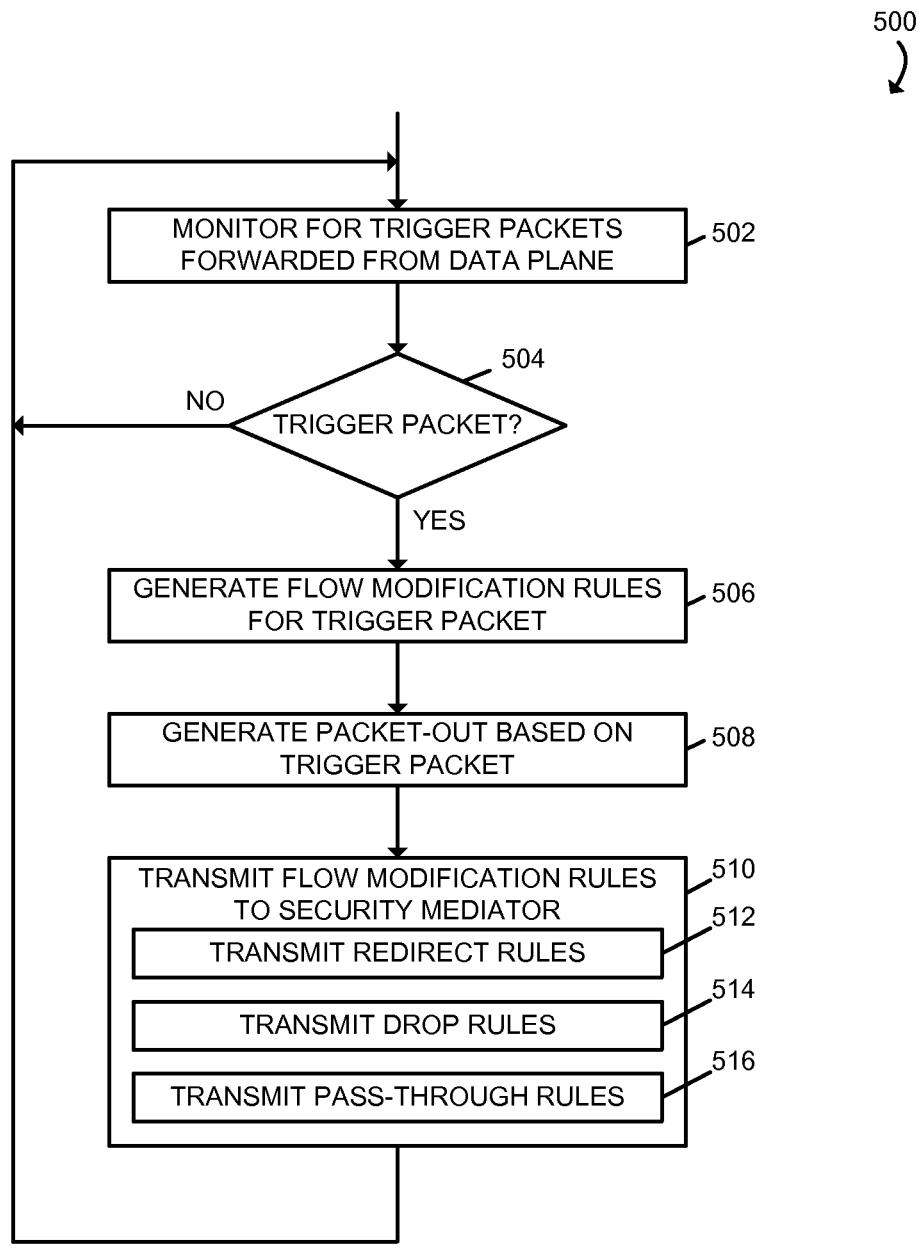
FIG. 5 is a simplified flow diagram of at least one embodiment of another method by which the security actuator of FIGS. 1 and 2 may actuate flow policy directives in the dynamically programmable network.

Referring now to FIG. 5, a method 500 for handling trigger packets 116 is shown. The method 500 may be embodied as computerized programs, routines, logic, and/or instructions of a computing system, e.g., as part of the security actuator 102, for example. The method 500 begins in block 502, in which the security actuator 102 monitors for trigger packets 116 received from the data plane of the dynamically programmable computer network 100. Those trigger packets 116 may be generated in response to one or more trigger rules that have been installed on the network 100, as described above. In use, the trigger packets 116 may be identified by one or more of the network switches 130, and then forwarded from the switches 130 to the network flow controller 120. The trigger packets 116 may then be forwarded to the security actuator 102, for example through the security mediation service 150 via a client northbound API, southbound API, callback interface, or other mechanism. In block 504, the security actuator 102 determines whether a trigger packet 116 has been received. If not, the method 500 loops back to block 502 to continue monitoring for trigger packets 116. If a trigger packet 116 has been received, the method 500 advances to block 506.

In block 506, the security actuator 102 generates one or more flow modification rules based on the received trigger packet 116. As described above, the flow modification rules control flow of communications across the network 100. The flow modification rules are generated to implement the associated flow policy directive 104. Because the flow modification rules are based on a received trigger packet 116, they may include matching rules based on particular attributes of the received trigger packet 116 such as internet address, hardware address, switch port, or other data.

In block 508, in some embodiments, in block 508 the security actuator 102 generates a packet-out based on the trigger packet 116. For example, the flow policy directive 104 may specify one of several blocking styles to apply to a network flow to be blocked. In some of the blocking styles, rather than just dropping a matching packet, the security actuator 102 may generate a response to the originating host, such as an ICMP (Internet Control Message Protocol) destination unreachable packet or a TCP (Transmission Control Protocol) connection-reset.

In block 510, the security actuator 102 transmits the generated flow modification rules to the security mediation service 150. As described above, the security actuator 102 may communicate the packet disposition directives 106 to the security mediation service 150 using any appropriate technique or protocol, including a northbound API of the network flow controller 120 and/or the security mediation service 150. The transmitted flow modification rules may be assigned a higher priority than the trigger rules already installed on the network 100 and thus may change the behavior of the network 100 for certain flows of communication. As described above, the particular flow modification rules transmitted may depend on the associated flow policy directive 104. In block 512, the security actuator 102 may transmit one or more redirect rules. The redirect rules may cause the network switches 130 to rewrite packet header information and transfer communications to an identified remap address and/or network port. In block 514, the security actuator 102 may transmit one or more drop rules. The drop rules may cause the network switches 130 to drop or deny communication flows to or from particular network addresses, ports, hardware addresses, or other matching flows. In some embodiments, a packet is dropped by default if no matching rule is found; thus, a "drop rule" may be embodied as a rule with no associated action or as the absence of a matching rule. In block 516, the security actuator 102 may transmit one or more pass-through rules. A pass-through rule may forward matching packets without redirecting, rewriting, dropping, or otherwise modifying the packets. For example, a pass-through rule may allow traffic that is initially addressed to a remap address to be forwarded without changes. After transmitting the flow modification rules, the method 500 loops back to block 502 to monitor for additional trigger packets 116.

Example Usage Scenarios

Figure 6:
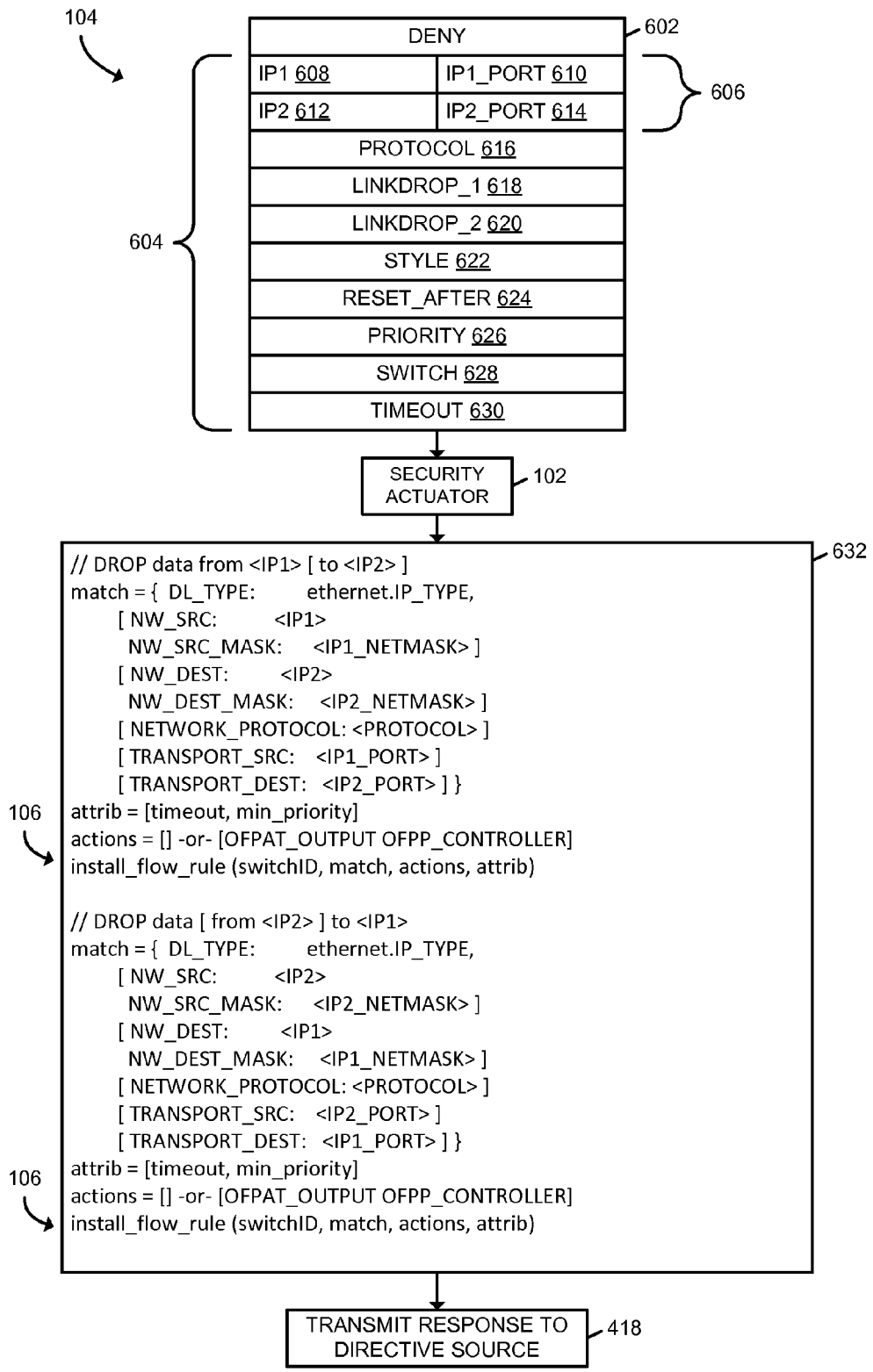

Referring now to FIG. 6, an embodiment of a method 600 for translating a flow policy directive 104 into a number of associated packet disposition directives 106 is illustrated. The illustrative flow policy directive 104 is a "deny" directive, which includes a deny command 602 and a number of parameters 604. The parameters 604 further include at least one of a set of addressing parameters 606. The addressing parameters 606 include IP1 608, IP1_PORT 610, IP2 612, and IP2_PORT 614. IP1 608 and IP2 612 may be expressed in classless inter-domain routing (CIDR) notation and thus may specify a particular network address or address range. Those addressing parameters 606 indicate the source and destination address/port combinations that should be blocked on the network 100. In other words, if all of the addressing parameters 606 are specified, the deny directive blocks all network traffic to or from IP1:IP1_PORT and from or to IP2:IP2_PORT.

The parameters 604 further include PROTOCOL 616, which may specify the particular protocol to drop, such as TCP, UDP, TCP and UDP (User Datagram Protocol), ICMP, or IP. LINKDROP_1 618 and LINKDROP_2 620 may broaden, when applicable, the scope of traffic blocking to the link-layer address(es) associated with the targeted traffic to be blocked. In other words, all traffic to or from a host may be blocked, not just its traffic with a specific IP address. The appropriateness of such an action may depend on physical topology of the network 100 and the role associated with the host/hardware using the link-layer address (e.g., individual wired hosts versus access points or routers).

STYLE 622 specifies a blocking style to be used. Particular blocking styles may include DROP, ICMP, or RESET. DROP may simply drop matching packets. ICMP may generate, for all IP packets, ICMP destination unreachable packets that include a code that may be specified in the flow policy directive 104. Non-IP packets may be dropped as with the DROP blocking style. RESET may extend the ICMP blocking style to generate a TCP connection-reset when applicable for detected activity, instead of generating ICMP destination unreachable messages. If the detected activity is not TCP, the response may be the same as for the ICMP blocking style. RESET_AFTER 624 may be specified for the ICMP or RESET blocking styles. When the blocking style calls for packet generation (e.g., ICMP or RESET), not every received trigger packet 116 will generate packet-out. Rather, a drop rule may be added for each trigger packet 116 to suppress further trigger packets 116 for that fully-specified flow. The RESET_AFTER 624 parameter may specify the timeout of those fully-specified rules.

PRIORITY 626 specifies a priority for the overall flow policy directive 104. As described above, a particular flow policy directive 104 may be translated into a number of packet disposition directives 106 (such as flow modification rules). If two flow policy directives 104 are specified with a different PRIORITY 626, then all of the packet disposition directives 106 associated with the lower-priority flow policy directive 104 will be of lower priority than all of the packet disposition directives 106 associated with the higher-priority flow policy directive 104 (i.e., flow policy directives 104 of differing priorities will not have any overlap in actual flow-modification priorities). In one embodiment, the PRIORITY 626 may be specified in an absolute range from zero to UINT16_MAX/4 (equal to 16383), inclusive. In that embodiment, each of the packet disposition directives 106 may be assigned one of four priority levels, relative to the priority of the flow policy directive 104. For example, relative priority levels as shown in Table 2 may be used:

TABLE 2

Relative priority of packet disposition directives 106.

| Priority | Rules |
| --- | --- |
| <PRIORITY 626> + 3 | Full-flow-specific rules (no wild-match criteria) |
| <PRIORITY 626> + 2 | Redirect trigger rules (may have match criteria overlap with lower-priority deny rules) |
| <PRIORITY 626> + 1 | Rules for link-drop traffic |
| <PRIORITY 626> | Rules describing traffic to modify from flow policy directive 104 parameters 604 |

SWITCH 628 may specify a particular switch 130 of the network 100 to which the flow policy directive 104 applies. If left unspecified, the default may be to use the first switch 130 listed by the network flow controller 120.

TIMEOUT 630 may specify the minimum amount of time that an installed flow policy directive 104 remains active in the network 100. A value of zero, the default, may mean that the directive remains active indefinitely. The security actuator 102 may subtract elapsed time from a non-zero time-out value when installing a new flow modification rule based on a trigger event (so that all directive-related rules expire at the same time). Note that because flow policy directives 104 may persist for longer than the lifespan of the security actuator 102, the security actuator 102 may use persistent storage (e.g., the data storage device 1118 described below) to record any packet disposition directives 106 that it installs as a state-recovery mechanism.

As described above, the deny flow policy directive 104 may be submitted to the security actuator 102, and then the security actuator 102 generates a number of packet disposition directives 106. In the illustrative method 600, the generated packet disposition directives 106 are represented by pseudocode 632. As shown in the pseudocode 632, the security actuator 102 may generate two packet disposition directives 106 to implement the deny flow policy directive 104. The first packet disposition directive 106 may drop data from IP1 608 to IP2 612, and the second packet disposition directive 106 may drop data from IP2 612 to IP1 608. As shown in the pseudocode 632, each of the packet disposition directive 106 is constructed by defining a match parameter (specifying network addresses, protocol, transport port, and other information), a number of attributes, and a set of actions that all may be based on the parameters 604 supplied with the flow policy directive 104. Note that the action may be empty—meaning that matching packets are dropped—or include the OFPAT_OUTPUT OFPP_CONTROLLER action, meaning that matching packets are forwarded to the network flow controller 120 for further analysis. Thus, the packet disposition directives 106 may be flow modification rules or trigger rules. Trigger rules may be used, for example, to implement linkdrop attributes or for certain blocking styles. After installing the packet disposition directives 106, the security actuator 102 may transmit a response to the source of the flow policy directive 104, as described above in connection with block 418 of FIG. 4.

Figure 7:
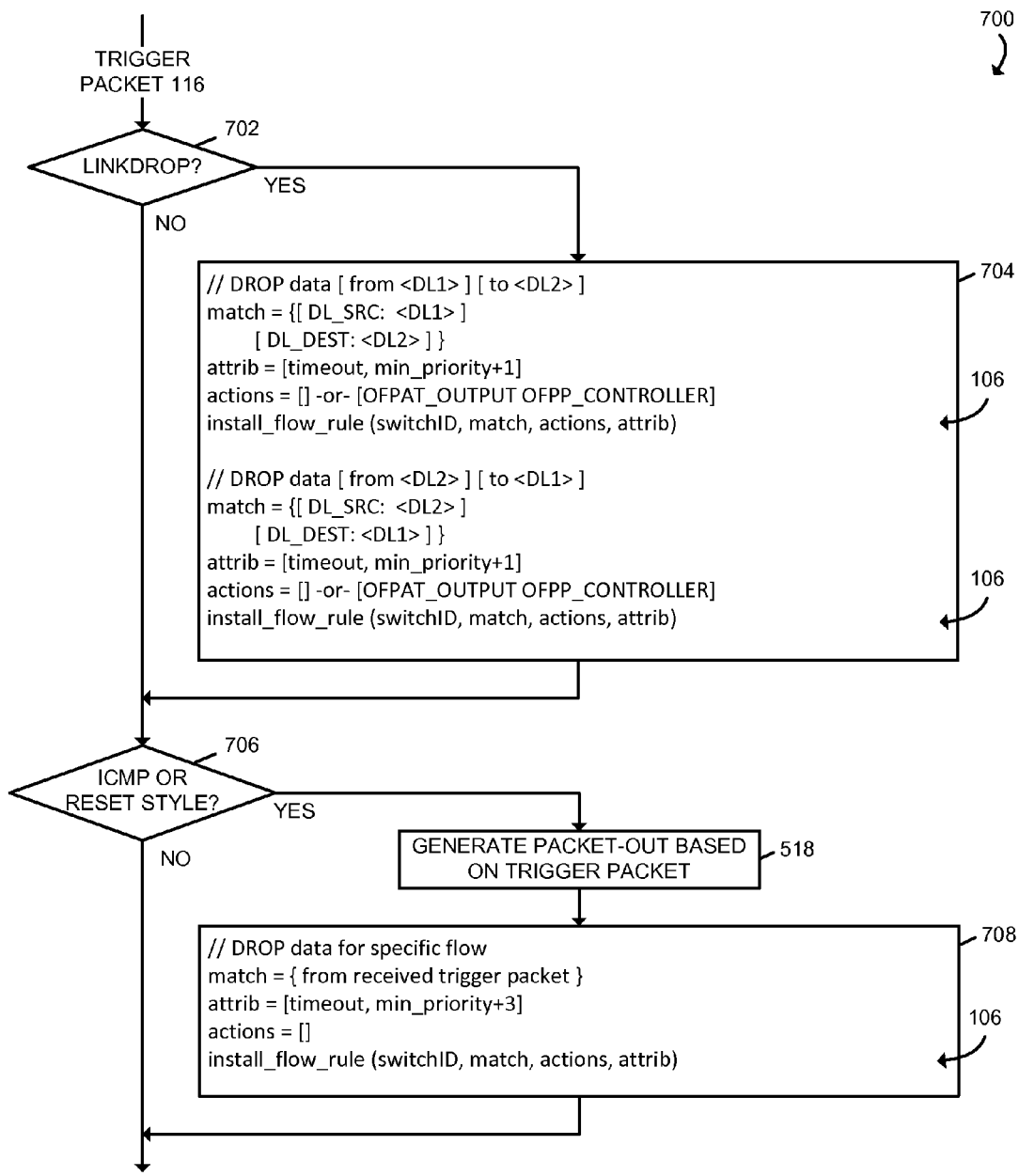

Referring now to FIG. 7, an embodiment of a method 700 for processing trigger packets 116 received in response to installing packet disposition directives 106 corresponding to a deny flow policy directive 104 is illustrated. Those packet disposition directives 106 may have been generated by the security actuator 102 as described above in connection with FIG. 6. Following receipt of a trigger packet 116, in block 702 the security actuator 102 determines whether a linkdrop parameter (e.g., LINKDROP_1 618 or LINKDROP_2 620) has been requested. If not, the method 700 advances to block 706, described below. If a linkdrop parameter has been specified, the security actuator 102 generates packet disposition directives 106 as represented by pseudocode 704.

As illustrated in pseudocode 704, the security actuator 102 may install two packet disposition directives 106 that match traffic from <DL1> to <DL2> and from <DL2> to <DL1>. The identifiers <DL1> and <DL2> represent data layer addresses (e.g., MAC addresses) included in the trigger packet 116. Thus, by using a trigger rule, the security actuator 102 may generate packet disposition directives 106 based on hardware address information discovered dynamically in response to actual traffic flowing over the network 100. Similar to the pseudocode 632 described above in connection with FIG. 6, the action may be empty, to block all traffic, or may direct traffic to the network flow controller 120, for example to support certain blocking styles. Additionally, note that the priority of linkdrop-related packet disposition directives 106 is higher than the original trigger rules, meaning that the linkdrop rules will have precedence for matching traffic. After installing the packet disposition directives 106, the method 700 advances to block 706.

In block 706, the security actuator 102 determines whether the flow policy directive 104 has requested an ICMP or RESET blocking style. If not, the method 700 is completed. If so, the method 700 advances to block 518, in which the security actuator 102 generates a packet-out based on the trigger packet 116, as described above. After generating any packet-out, the security actuator 102 generates a packet disposition directive 106 as shown in pseudocode 708.

As shown in pseudocode 708, after generating a packet-out, the security actuator 102 generates a packet disposition directive 106 to drop all data for the specific flow matching the trigger packet 116. The packet disposition directive 106 thus matches traffic based on the attributes of the trigger packet 116 (e.g., source, destination, protocol, hardware addresses, etc.). Additionally, the packet disposition directive 106 specifies a timeout value corresponding to the TIMEOUT 630 parameter. In other words, in use, the security actuator 102 generates a packet-out in response to a particular flow and then blocks all further traffic matching that flow for some period of time, for example one minute. Thus, the security actuator 102 may reduce spurious network traffic that may be caused by malicious or incorrect attempts to transmit flows that have been blocked.

Figure 8:
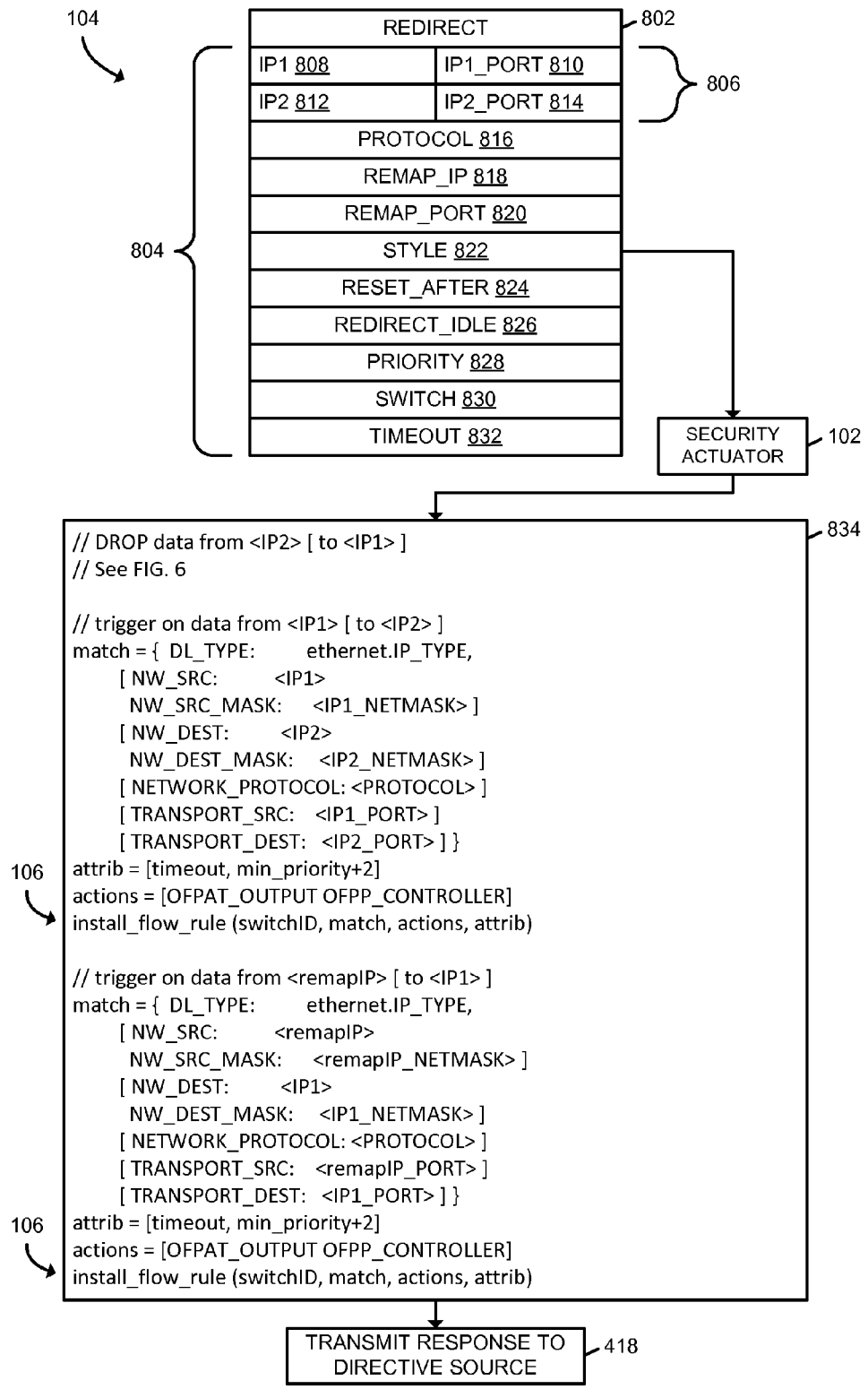

Referring now to FIG. 8, an embodiment of a method 800 for translating another flow policy directive 104 into a number of associated packet disposition directives 106 is illustrated. The illustrative flow policy directive 104 is a "redirect" directive, which includes a redirect command 802 and a number of parameters 804. The parameters 804 further include at least one of a set of addressing parameters 806. The addressing parameters 806 include IP1 808, IP1_PORT 810, IP2 812, and IP2_PORT 814. The description of those addressing parameters 806 is similar to the addressing parameters 606 described above in connection with FIG. 6, and for clarity is not repeated here. Similarly, the parameters 804 further include PROTOCOL 816, STYLE 822, RESET_AFTER 824, PRIORITY 828, SWITCH 830, and TIMEOUT 832, the description of which is similar to the PROTOCOL 616, STYLE 622, RESET_AFTER 624, PRIORITY 626, SWITCH 628, and TIMEOUT 630 of FIG. 6, respectively.

The redirect flow policy directive 104 further includes REMAP_IP 818 and REMAP_PORT 820. This directive instructs the network 100 to redirect matching network traffic (e.g., traffic matching the addressing parameters 806) to the REMAP_IP 818 address and REMAP_PORT 820 (if specified). To implement this directive, the security actuator 102 directs the network 100 to rewrite matching traffic from IP1:IP1_PORT to IP2:IP2_PORT as traffic from IP1:IP_PORT to REMAP_IP:REMAP_PORT, and to deny matching traffic from IP2:IP2_PORT to IP1:IP1_PORT. Further, any IP1:IP1_PORT to IP2:IP2_PORT traffic from pre-existing TCP connections may be blocked according to STYLE 822.

REDIRECT_IDLE 826 specifies how long flow-specific redirect packet disposition directives 106 must be idle before they are removed. The packet disposition directive 106 idle-timeout may be set to this value and the hard-timeout value may be set to zero. For example, the default for REDIRECT_IDLE may be 5 minutes, and zero (i.e., indefinite) may not be allowed. Thus, in this situation the security actuator 102 may create packet disposition directives 106 that can exceed the TIMEOUT 832 duration. As such, the flow-specific redirect packet disposition directives 106 may remain active on the network 100, even when the corresponding flow policy directive 104 is canceled, and time-out only when the specific flow becomes idle.

As described above, the deny flow policy directive 104 may be submitted to the security actuator 102, and then the security actuator 102 generates a number of packet disposition directives 106. In the illustrative method 800, the generated packet disposition directives 106 are represented by pseudocode 834. As shown in the pseudocode 834, the security actuator 102 may generate one or more packet disposition directives 106 to drop data from IP2 812 to IP1 808, as described above in connection with FIGS. 6 and 7. The security actuator 102 may also generate two packet disposition directives 106 that function as trigger rules. The first packet disposition directive 106 may trigger on data from IP1 808 to IP2 812, and the second packet disposition directive 106 may trigger on traffic from REMAP_IP 818 to IP1 808. Those trigger rules may also match packets based on the supplied values of the parameters 804, as shown. After installing the packet disposition directives 106, the security actuator 102 the security actuator 102 may transmit a response to the source of the flow policy directive 104, as described above in connection with block 418 of FIG. 4.

Figure 9:
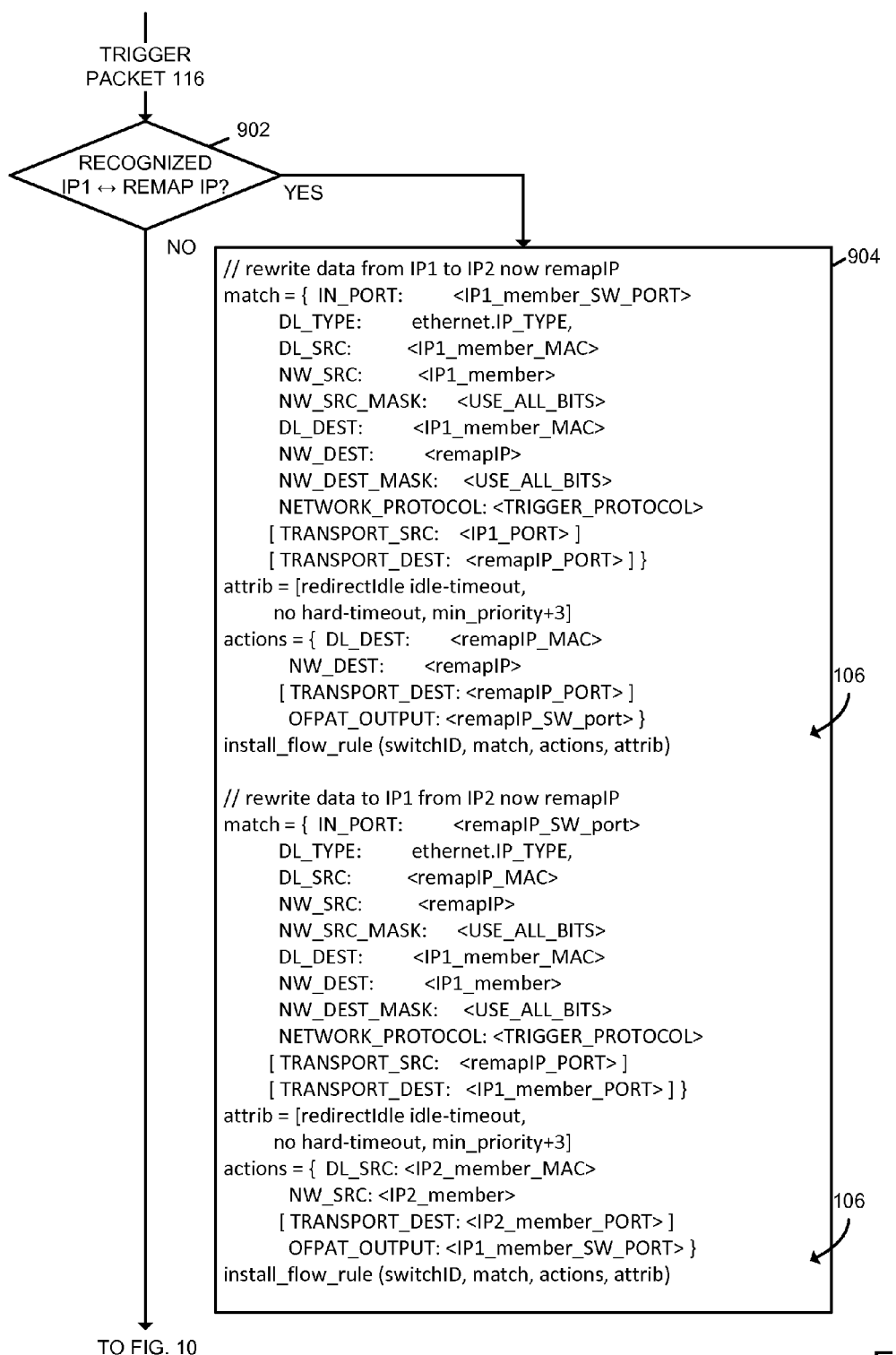

Referring now to FIG. 9, an embodiment of a method 900 for processing trigger packets 116 received in response to installing packet disposition directives 106 corresponding to a redirect flow policy directive 104 is illustrated. Those packet disposition directives 106 may have been generated by the security actuator 102 as described above in connection with FIG. 8. In block 902, the security actuator 102 determines whether the trigger packet 116 is recognized as being addressed between IP1 808 and REMAP_IP 818. If not, the method 900 generates packet disposition directives 106 as shown in pseudocode 906, described below in connection with FIG. 10. If the trigger packet 116 is recognized, the security actuator 102 generates packet disposition directives 106 as shown in pseudocode 904.

As shown in pseudocode 904, the security actuator 102 generates two packet disposition directives 106 to rewrite data. The first packet disposition directive 106 rewrites data packets originally addressed from IP1 808 to IP2 812 to be addressed from IP1 808 to REMAP_IP 818 and forwarded accordingly. The second packet disposition directive 106 rewrites data packets originally addressed from REMAP_IP 818 to IP1 808 to be addressed from IP2 812 to IP1 808 and forwarded accordingly. The packet disposition directives 106 may include further match attributes based on the attributes of the trigger packet 116 as shown (e.g., network address, hardware address, port, etc.).

Referring now to FIG. 10, if the trigger packet 116 is not recognized, the security actuator 102 may generate one or more packet disposition directives 106 as shown in pseudocode 906. As shown, the packet disposition directive 106 passes through data to IP1 808 from REMAP_IP 818; in other words, matching data is forwarded across the network 100 as normal, without being rewritten or redirected.

As described above, the security actuator 102 may be capable of implementing numerous other flow policy directives 104. For example, the security actuator 102 may implement a quarantine flow policy directive 104. The quarantine flow policy directive 104 may block all general traffic through a switch 130 to and/or from a specified quarantined IP address, with the exception that all web (i.e., port 80) requests may be redirected to a specified notifier IP address/port. Additionally, DNS requests may be redirected to a particular DNS IP address (which may be the same as the notifier IP address). Thus, the notifier may return web pages informing the user of the quarantine, providing remediation instructions, requesting the user to contact administrative support, or providing other information. To implement the quarantine directive, the security actuator 102 may generate packet disposition directives 106 similar to the deny and redirect directives described above in connection with FIGS. 6-10.

For example, the security actuator 102 may add (at min_priority) two trigger rules for source or destination equal to the quarantined IP. The security actuator 102 may determine whether received trigger packets 116 are related to DNS (port 53 for TCP and UDP) or web (port 80), and if so, handle the trigger packet 116 in the same was as for a redirect directive with STYLE 822 set. In some embodiments, DNS traffic (port 53 TCP and UDP) may be handled by pass-through rules rather than being re-written or blocked. This may allow a host to complete DNS normally in preparation for accessing web pages, which will then be redirected to the notifier (or blocked if not using port 80). The security actuator 102 may handle all other traffic the same as for a deny directive with the specified LINKDROP_1 618, LINKDROP_2 620, and/or STYLE 622. It should be noted that when LINKDROP_1 618 and/or LINKDROP_2 620 are specified, ARP requests and ARP replies to and from the quarantined IP may still be allowed.

In some embodiments, the security actuator 102 may implement other flow policy directives 104 as shown in Table 3:

TABLE 3

Flow policy directives.

| Directive | Description |
| --- | --- |
| BLOCK | An alias for "DENY" (with different parameter names). |
| UNPLUG | Shut down a specific port or the entire switch. |
| ADJUST | Adjust time-out of flow policy directive. |
| CANCEL | Request removal of currently-active flow policy directives. |
| DEFAULTS | Sets and displays default values for the security actuator. |
| HELP | Provides directive help-text. |
| HOSTINFO | Provides information on hosts. |
| INFO | List active flow policy directives. |
| SHUTDOWN | Terminate the security actuator. |
| SWITCHES | Lists the switches managed by the network controller/switch interface. |
| QUIT | Disconnects the directive source issuing the directive (no shutdown). |

Implementation Examples

Figure 11:
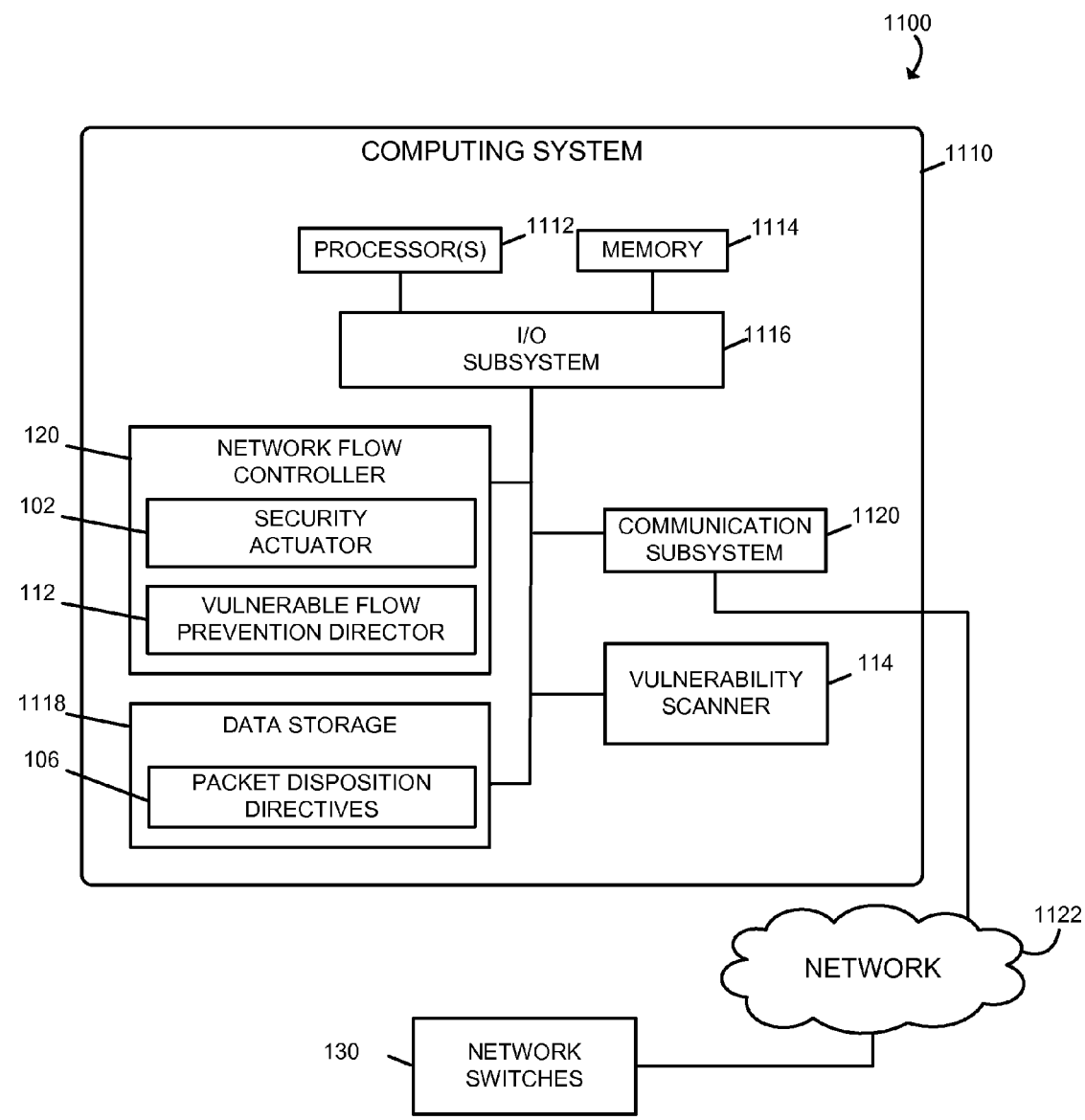
FIG. 11 is a simplified block diagram of an exemplary computing environment in connection with which at least one embodiment of the security actuator of FIGS. 1 and 2 may be implemented.

Referring now to FIG. 11, a simplified block diagram of an exemplary computing environment 1100 in which the security actuator 102 may be implemented, is shown. The illustrative environment 1100 includes a computing system 1110, which may implement the network flow controller 120, the security actuator 102, the security mediation service 150, one or more of the network security applications 108, 110, the vulnerable flow prevention director 112, and/or the vulnerability scanner 114 on a single computing device or multiple computing devices that are coupled to the network 100 (shown as a network 1122 in FIG. 11).

The illustrative computing system 1110 includes at least one processor 1112 (e.g. a microprocessor, microcontroller, digital signal processor, etc.), memory 1114, and an input/output (I/O) subsystem 1116. The computing system 1110 may be embodied as any type of computing device(s) such as a personal computer (e.g., desktop, laptop, tablet, smart phone, body-mounted device, etc.), a server 190, an enterprise computer system, a network of computers, a combination of computers and other electronic devices, or other computing devices. Although not specifically shown, it should be understood that the I/O subsystem 1116 typically includes, among other things, an I/O controller, a memory controller, and one or more I/O ports. The processor 1112 and the I/O subsystem 1116 are communicatively coupled to the memory 1114. The memory 1114 may be embodied as any type of suitable computer memory device (e.g., volatile memory such as various forms of random access memory).

The I/O subsystem 1116 is communicatively coupled to a number of components including one or more data storage devices 1118 and a communication subsystem 1120. Although not specifically shown, one or more user input devices (e.g., keyboard, touch screen, etc.) and output devices (e.g., a display) may be coupled to the I/O subsystem 1116 to allow a human operator, such as a network administrator, to, for example, establish and update a network security policy. The data storage 1118 may include one or more hard drives or other suitable data storage devices (e.g., flash memory, memory cards, memory sticks, and/or others). In some embodiments, some or all of the packet disposition directives 106 generated by the security actuator 102 may reside in the data storage device 1118. In some embodiments, portions of systems software (e.g., an operating system, etc.), framework/middleware (e.g., APIs, object libraries, etc.), and/or the security actuator 102 reside at least temporarily in the data storage device 1118. Portions of systems software, framework/middleware, and/or the security actuator 102 may be copied to the memory 1114 during operation of the computing system 1110, for faster processing or other reasons. In some embodiments, portions of the security actuator 102 may be distributed across multiple computing devices (e.g., servers 190) on the network 100.

The communication subsystem 1120 communicatively couples the computing system 1110 to the network 1122, which may be a local area network, wide area network, personal cloud, enterprise cloud, public cloud, and/or the Internet, for example. Accordingly, the communication subsystem 1120 may include one or more wired or wireless network interface cards or adapters, for example, as may be needed pursuant to the specifications and/or design of the particular computing system 1110. The communication subsystem 1120 may be used by the network flow controller 120 to communicate with the network switches 132, 134, 136 in order to control and define the dynamically programmable network 100. For example, the communication subsystem 1120 may include one or more dedicated control channels for communication with one or more of the network switches 132, 134, 136.

The computing system 1110 may include other components, sub-components, and devices not illustrated in FIG. 11 for clarity of the description. In general, the components of the computing system 1110 are communicatively coupled as shown in FIG. 11 by electronic signal paths, which may be embodied as any type of wired or wireless signal paths capable of facilitating communication between the respective devices and components.

Additional Examples

Illustrative examples of the technologies disclosed herein are provided below. An embodiment of the technologies may include any one or more, and any combination of, the examples described below.

According to at least one embodiment of this disclosure, a security service for a dynamically-programmable computer network is embodied in one or more computer readable storage media and includes a plurality of instructions that, when executed, cause a computing device to: receive a flow policy directive from a flow policy directive source, the flow policy directive including a command and a set of parameters, wherein the command and the set of parameters describe a flow policy objective for the dynamically programmable computer network; convert the flow policy directive to one or more packet disposition directives, the one or more packet disposition directives to cause one or more network switches of the dynamically programmable computer network to implement the flow policy directive to control flow of communications across the dynamically programmable computer network; compare the one or more packet disposition directives to a set of currently active flow rules of the dynamically programmable computer network; and in response to the comparison of the one or more packet disposition directives to the set of currently active flow rules, add the one or more packet disposition directives to the set of currently active flow rules.

In the security service, to convert the flow policy directive may include to, in response to a flow policy directive to modify communications associated with a network service identifier: create a plurality of flow modification rules to cause the one or more network switches to modify the communications associated with the network service identifier. In the security service, to receive the flow policy directive may include to receive a flow policy directive to deny communications associated with a network service identifier comprising one or more of a network address or a network port; and to convert the flow policy directive may include to, in response to the flow policy directive, create a plurality of flow modification rules to drop data communications associated with the network service identifier. In the security service, to convert the deny flow policy directive may include to (i) create a first flow modification rule to drop data communications addressed from the network service identifier and (ii) create a second flow modification rule to drop data communications addressed to the network service identifier. In the security service, to receive the flow policy directive may include to receive a deny flow policy directive to deny communications associated with a network service identifier comprising one or more of a network address or a network port; and to convert the flow policy directive may include to, in response to the deny flow policy directive, create a plurality of trigger rules to cause the one or more network switches to (i) forward to the computing device a trigger packet associated with the network service identifier and (ii) drop data communications associated with the network service identifier. In the security service, to receive the flow policy directive may include to receive a redirect flow policy directive to redirect communications associated with a network service identifier to a redirect internet address, the network service identifier to include one or more of a network address or a network port; and to convert the redirect flow policy directive may include to, in response to the redirect flow policy directive, create a plurality of trigger rules to cause the one or more network switches to redirect a trigger packet associated with the network service identifier. In the security service, to receive the flow policy directive may include to receive a quarantine flow policy directive to quarantine communications associated with a network service identifier to a notifier internet address, the network service identifier to include one or more of a network address or a network port; and to convert the flow policy directive may include to, in response to the quarantine flow policy directive, create a plurality of trigger rules to cause the one or more network switches to forward to the computing device a trigger packet associated with the network service identifier.

The security service may create a trigger rule to cause the one or more network switches to forward a trigger packet to the computing device; and create, in response to receipt of a trigger packet, a flow modification rule to cause the one or more network switches to control flow of communications across the dynamically programmable computer network. The security service may receive a flow policy directive to deny communications associated with a network service identifier comprising one or more of a network address or a network port; create a first flow modification rule to drop data communications addressed from the network service identifier; and create a second flow modification rule to drop data communications addressed to the network service identifier. The security service may receive a flow policy directive to deny communications associated with a network service identifier comprising one or more of a network address or a network port; create a first trigger rule to cause the one or more network switches to forward to the computing device a trigger packet addressed from the network service identifier; create a second trigger rule to cause the one or more network switches to forward to the computing device a trigger packet addressed to the network service identifier; create, in response to receipt of a trigger packet, a first flow modification rule to drop data communications addressed from a hardware address of the trigger packet associated with the network service identifier; and create, in response to the receipt of the trigger packet, a second flow modification rule to drop data communications addressed to the hardware address of the trigger packet; wherein the first flow modification rule and the second flow modification rule have a higher priority than the first trigger rule and the second trigger rule.

The security service may receive a flow policy directive to deny communications associated with a network service identifier comprising one or more of a network address or a network port; create a first trigger rule to cause the one or more network switches to forward to the computing device a trigger packet addressed from the network service identifier; create a second trigger rule to cause the one or more network switches to forward to the computing device a trigger packet addressed to the network service identifier; and create, in response to receipt of a trigger packet, a first flow modification rule to drop data communications that match the trigger packet; wherein the security actuator further comprises a plurality of instructions that, when executed, cause the computing device to generate a packet-out in response to the receipt of the trigger packet; and wherein the first flow modification rule has a higher priority than the first trigger rule and the second trigger rule. The security service may generate an ICMP destination unreachable packet or a TCP connection-reset packet.

The security service may receive a flow policy directive to redirect communications associated with a network service identifier to a redirect internet address, the network service identifier to include one or more of a network address or a network port; create a first trigger rule to cause the one or more network switches to forward to the computing device a trigger packet addressed from the network service identifier; create a second trigger rule to cause the one or more network switches to forward to the computing device a trigger packet addressed from the redirect internet address; create, in response to receipt of a trigger packet, a first flow modification rule to forward to the redirect internet address data communications addressed from the network service identifier and addressed to a second network service identifier of the trigger packet and modify the data communications to identify the redirect internet address; and create, in response to the receipt of the trigger packet, a second flow modification rule to forward to the network service identifier data communications addressed from the redirect internet address and addressed to the network service identifier and modify the data communications to identify the second network service identifier; wherein the first flow modification rule and the second flow modification rule have a higher priority than the first trigger rule and the second trigger rule.

The security service may receive a flow policy directive to quarantine communications associated with a network service identifier to a notifier internet address, the network service identifier to include one or more of a network address or a network port; create a first trigger rule to cause the one or more network switches to forward to the computing device a trigger packet addressed from the network service identifier; create a second trigger rule to cause the one or more network switches to forward to the computing device a trigger packet addressed to the network service identifier; create, in response to receipt of a trigger packet associated with a predefined network service, a first flow modification rule to forward to the notifier internet address data communications addressed from the network service identifier and modify the data communications to identify the notifier internet address; and create, in response to the receipt of the trigger packet a second flow modification rule to forward to the network service identifier data communications addressed from the notifier internet address and modify the data communications to identify the second network service identifier; wherein the first flow modification rule and the second flow modification rule have a higher priority than the first trigger rule and the second trigger rule.

According to at least one embodiment of this disclosure, a method for actuating flow policy directives in a dynamically programmable computer network includes, with at least one computing device, receiving a flow policy directive from a flow policy directive source; converting the flow policy directive to one or more packet disposition directives to implement the flow policy directive at one or more network switches of the dynamically programmable computer network; and transmitting the one or more packet disposition directives to a flow controller of the dynamically programmable computer network, the flow controller to mediate conflicts between packet disposition directives and transmit packet disposition directives to network switches of the dynamically programmable network. The flow policy directive may include a command and a set of parameters, the command and the set of parameters describing a flow policy objective for a dynamically programmable computer network; and the one or more packet disposition directives may be communicated from the flow controller to the one or more network switches to cause the one or more network switches to control flow of communications across the dynamically programmable computer network to implement the flow policy directive. The method may include creating a trigger rule to cause the one or more network switches to forward a trigger packet to the computing device. The method may further include creating, in response to receiving the trigger packet, a flow modification rule to cause the one or more network switches to control flow of communications across the dynamically programmable computer network.

The method may include receiving a flow policy directive to deny communications associated with a network service identifier comprising one or more of a network address or a network port; creating a first flow modification rule to drop data communications addressed from the network service identifier; and creating a second flow modification rule to drop data communications addressed to the network service identifier.

The method may include receiving a flow policy directive to redirect communications associated with a network service identifier to a redirect internet address, the network service identifier comprising one or more of a network address or a network port; creating a first trigger rule to cause the one or more network switches to forward to the computing device a trigger packet addressed from the network service identifier; creating a second trigger rule to cause the one or more network switches to forward to the computing device a trigger packet addressed from the redirect internet address; creating, in response to receiving a trigger packet, a first flow modification rule to forward to the redirect internet address data communications addressed from the network service identifier and addressed to a second network service identifier of the trigger packet and modify the data communications to identify the redirect internet address; and creating, in response to receiving the trigger packet, a second flow modification rule to forward to the network service identifier data communications addressed from the redirect internet address and addressed to the network service identifier and modify the data communications to identify the second network service identifier; wherein the first flow modification rule and the second flow modification rule have a higher priority than the first trigger rule and the second trigger rule.

The method may include receiving a flow policy directive to quarantine communications associated with a network service identifier to a notifier internet address, the network service identifier comprising one or more of a network address or a network port; creating a first trigger rule to cause the one or more network switches to forward to the computing device a trigger packet addressed from the network service identifier; creating a second trigger rule to cause the one or more network switches to forward to the computing device a trigger packet addressed to the network service identifier; creating, in response to receiving a trigger packet associated with a predefined network service, a first flow modification rule to forward to the notifier internet address data communications addressed from the network service identifier and modify the data communications to identify the notifier internet address; and creating, in response to receiving the trigger packet a second flow modification rule to forward to the network service identifier data communications addressed from the notifier internet address and modify the data communications to identify the second network service identifier; wherein the first flow modification rule and the second flow modification rule have a higher priority than the first trigger rule and the second trigger rule.

According to at least one embodiment of this disclosure, a security actuator for actuating flow policy directives in a dynamically programmable computer network includes a plurality of instructions embodied in one or more computer readable storage media that, when executed, cause a computing device to: receive a flow policy directive from a source of flow policy directives, and in response to the flow policy directive: initiate an automated mechanism to communicate with one or more network switches of the dynamically programmable computer network, the automated mechanism to: monitor for packets having one or more criteria matching a trigger rule; and in response to a packet having a criterion matching the trigger rule, cause the one or more network switches to implement the flow policy directive.

The automated mechanism may cause the one or more network switches to forward the matching packet to the security actuator. The automated mechanism may cause the security actuator to, in response to the matching packet, create one or more packet disposition directives based on the flow policy directive. The security actuator may, in response to a determination by the automated mechanism that a packet has a criterion matching the trigger rule, transmit a packet disposition directive to a security mediator of the dynamically programmable network. The security actuator may create a plurality of packet disposition directives in response to the flow policy directive, and the packet disposition directives may include: a trigger rule to cause the one or more network switches to forward to the security actuator a trigger packet addressed from the network service identifier; a flow modification rule to one of: drop, forward, deny and redirect data communications that match the trigger packet addressed from the network service identifier. The flow modification rule may have a higher priority than the trigger rule. The security actuator may generate a packet-out in response to receipt of the trigger packet. The packet disposition directives may include a second trigger rule to cause the one or more network switches to forward to the security actuator a trigger packet addressed to the network service identifier and a flow modification rule to one of: drop, forward, deny and redirect data communications that match the trigger packet addressed to the network service identifier. The security actuator may create a plurality of packet disposition directives in response to the flow policy directive, and the packet disposition directives may include: a trigger rule to cause the one or more network switches to forward to the security actuator a trigger packet addressed from a network service identifier; and a flow modification rule to forward to an internet address data communications addressed from the network service identifier. The flow modification rule may modify the data communications to identify the internet address.

General Considerations

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation of the security actuator 102.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:

1. A security service for a dynamically-programmable computer network, the security service embodied in one or more non-transitory computer readable storage media of a computing system and comprising a plurality of instructions that, when executed, cause the computing system to:
   monitor the dynamically programmable network for receipt of a flow policy directive from a flow policy directive source, the flow policy directive including a command and a set of parameters, wherein the command and the set of parameters describe a flow policy objective for the dynamically programmable computer network;
   in response to the monitoring, convert the flow policy directive to one or more packet disposition directives, the one or more packet disposition directives to cause one or more network switches of the dynamically programmable computer network to implement the flow policy directive to control flow of communications across the dynamically programmable computer network;
   compare the one or more packet disposition directives to a set of currently active flow rules of the dynamically programmable computer network; and
   in response to the comparison of the one or more packet disposition directives to the set of currently active flow rules, add the one or more packet disposition directives to the set of currently active flow rules,
   wherein conversion of the flow policy directive comprises parsing the flow policy directive to identify at least one valid command,
   wherein receipt of the flow policy directive comprises receiving a flow policy directive to quarantine communications associated with a network service identifier to a notifier internet address, the network service identifier including one or more of a network address or a network port, and
   wherein conversion of the flow policy directive further comprises creation of a first quarantine flow policy trigger rule to cause the one or more network switches to forward to a computing device a first quarantine trigger packet addressed from the network service identifier, creation of a second quarantine flow policy trigger rule to cause the one or more network switches to forward to the computing device a second quarantine trigger packet addressed to the network service identifier, creation, in response to receipt of the first or second quarantine trigger packet associated with a predefined network service, a first flow modification rule to (i) forward to the notifier internet address data communications addressed from the network service identifier and (ii) modify the data communications to identify the notifier internet address, and creation, in response to the receipt of the first or second trigger packet a second flow modification rule to (i) forward to the network service identifier data communications addressed from the notifier internet address and (ii) modify the data communications to identify the second network service identifier, and
   wherein the first flow modification rule and the second flow modification rule have a higher priority than the first quarantine flow policy trigger rule and the second quarantine flow policy trigger rule.

2. The security service of claim 1, wherein, conversion of the flow policy directive further comprises to:
  create a forwarding trigger rule to cause the one or more network switches to forward a forwarding trigger packet to a computing device; and
  create, in response to receipt of the forwarding trigger packet, a flow modification rule to cause the one or more network switches to control flow of communications across the dynamically programmable computer network.

3. The security service of claim 1, wherein conversion of the flow policy directive further comprises, in response to a flow policy directive to modify communications associated with a network service identifier, to create a plurality of flow modification rules to cause the one or more network switches to modify the communications associated with the network service identifier.

4. The security service of claim 1, further comprising to receive the flow policy directive further comprises to receive a flow policy directive to deny communications associated with a network service identifier comprising one or more of a network address or a network port; and
  conversion of the flow policy directive further comprises to, in response to the flow policy directive, create a plurality of flow modification rules to drop data communications associated with the network service identifier.

5. The security service of claim 4, further comprising to convert the deny flow policy directive, wherein the conversion of the deny flow policy directive comprises to (i) create a first flow modification rule to drop data communications addressed from the network service identifier and (ii) create a second flow modification rule to drop data communications addressed to the network service identifier.

6. The security service of claim 1, wherein receipt of the flow policy directive further comprises receiving a deny flow policy directive to deny communications associated with a network service identifier comprising one or more of a network address or a network port; and
  conversion of the flow policy directive comprises to, in response to the deny flow policy directive, create a plurality of deny flow policy trigger rules to cause the one or more network switches to (i) forward to a computing device a trigger packet associated with the network service identifier and (ii) drop data communications associated with the network service identifier.

7. The security service of claim 6, wherein conversion of the deny flow policy directive further comprises to:
  create a first deny flow policy trigger rule to cause the one or more network switches to forward to the computing device a first deny flow trigger packet addressed from the network service identifier;
  create a second deny flow policy trigger rule to cause the one or more network switches to forward to the computing device a second deny flow trigger packet addressed to the network service identifier;
  create, in response to receipt of the first or second deny flow trigger packet, a first flow modification rule to drop data communications addressed from a hardware address of the trigger packet associated with the network service identifier; and
  create, in response to the receipt of the first or second deny flow trigger packet, a second flow modification rule to drop data communications addressed to the hardware address of the first or second deny flow trigger packet;
  wherein the first flow modification rule and the second flow modification rule have a higher priority than the first deny flow policy trigger rule and the second deny flow policy trigger rule.

8. The security service of claim 1, wherein receipt of the flow policy directive further comprises to receive a flow policy directive to deny communications associated with a network service identifier comprising one or more of a network address or a network port; and
  conversion of the flow policy directive further comprises to:
  create a first deny flow policy trigger rule to cause the one or more network switches to forward to a computing device a trigger packet addressed from the network service identifier;
  create a second deny flow policy trigger rule to cause the one or more network switches to forward to the computing device a trigger packet addressed to the network service identifier; and
  create, in response to receipt of a trigger packet, a first flow modification rule to drop data communications that match the trigger packet;
  wherein the first flow modification rule has a higher priority than the first deny flow policy trigger rule and the second deny flow policy trigger rule.

9. The security service of claim 8, wherein to generate the packet-out comprises to generate an ICMP destination unreachable packet or a TCP connection-reset packet.

10. The security service of claim 1, wherein receipt of the flow policy directive further comprises to receive a redirect flow policy directive to redirect communications associated with a network service identifier to a redirect internet address, the network service identifier to include one or more of a network address or a network port, and
  to convert the redirect flow policy directive comprises to, in response to the redirect flow policy directive, create a plurality of redirect trigger rules to cause the one or more network switches to redirect a trigger packet associated with the network service identifier.

11. The security service of claim 1, wherein receipt of the flow policy directive further comprises to receive a flow policy directive to redirect communications associated with a network service identifier to a redirect internet address, the network service identifier to include one or more of a network address or a network port; and
  to convert the redirect flow policy directive comprises to:
  create a first redirect flow policy trigger rule to cause the one or more network switches to forward to a computing device a trigger packet addressed from the network service identifier;
  create a second redirect flow policy trigger rule to cause the one or more network switches to forward to the computing device a trigger packet addressed from the redirect internet address;
  create, in response to receipt of the redirect flow policy trigger packet, a first flow modification rule to (i) forward to the redirect internet address data communications addressed from the network service identifier and addressed to a second network service identifier of the trigger packet and (ii) modify the data communications to identify the redirect internet address; and
  create, in response to the receipt of the redirect flow policy trigger packet, a second flow modification rule to (i) forward to the network service identifier data communications addressed from the redirect internet address and addressed to the network service identifier and (ii) modify the data communications to identify the second network service identifier;
wherein the first flow modification rule and the second flow modification rule have a higher priority than the first redirect flow policy trigger rule and the second redirect flow policy trigger rule.

12. The security service of claim 1, wherein receipt of the flow policy directive further comprises to receive a quarantine flow policy directive to quarantine communications associated with a network service identifier to a notifier internet address, the network service identifier including one or more of a network address or a network port; and
  to convert the flow policy directive comprises to, in response to the quarantine flow policy directive, create a plurality of quarantine flow policy trigger rules to cause the one or more network switches to forward to a computing device a quarantine flow policy trigger packet associated with the network service identifier.

13. A method for actuating flow policy directives in a dynamically programmable computer network, the method comprising, with at least one computing device:
  monitoring the dynamically programmable computer network for receipt of a flow policy directive from a flow policy directive source;
  in response to the monitoring, converting the flow policy directive to one or more packet disposition directives, the one or more packet disposition directives to implement the flow policy directive at one or more network switches of the dynamically programmable computer network; and
  transmitting the one or more packet disposition directives to a security mediator of the dynamically programmable computer network, the security mediator mediating conflicts between packet disposition directives and transmitting packet disposition directives to network switches of the dynamically programmable network,
  wherein receiving the flow policy directive comprises receiving a flow policy directive to quarantine communications associated with a network service identifier to a notifier internet address, the network service identifier comprising one or more of a network address or a network port, and
  wherein converting the flow policy directive comprises:
    creating a first quarantine flow policy trigger rule to cause the one or more network switches to forward to the computing device a first quarantine trigger packet addressed from the network service identifier;
    creating a second quarantine flow policy trigger rule to cause the one or more network switches to forward to the computing device a second quarantine trigger packet addressed to the network service identifier;
    creating, in response to receiving the first or second trigger packet associated with a predefined network service, a first flow modification rule to (i) forward to the notifier internet address data communications addressed from the network service identifier and (ii) modify the data communications to identify the notifier internet address; and
    creating, in response to receiving the first or second trigger packet a second flow modification rule to (i) forward to the network service identifier data communications addressed from the notifier internet address and (ii) modify the data communications to identify the second network service identifier;
    wherein the first flow modification rule and the second flow modification rule have a higher priority than the first quarantine trigger rule and the second quarantine trigger rule;
    wherein converting the flow policy directive comprises parsing the flow policy directive to identify at least one valid command.

14. The method of claim 13, wherein:
  the flow policy directive includes a command and a set of parameters, the command and the set of parameters describing a flow policy objective for a dynamically programmable computer network; and
  the one or more packet disposition directives are to be communicated from the security mediator to the one or more network switches to cause the one or more network switches to control flow of communications across the dynamically programmable computer network to implement the flow policy directive.

15. The method of claim 13, wherein converting the flow policy directive comprises creating a forwarding flow policy trigger rule to cause the one or more network switches to forward a forwarding flow policy trigger packet to the computing device.

16. The method of claim 15, wherein converting the flow policy directive further comprises creating, in response to receiving the forwarding flow policy trigger packet, a flow modification rule to cause the one or more network switches to control flow of communications across the dynamically programmable computer network.

17. The method of claim 13, wherein:
  receiving the flow policy directive comprises receiving a flow policy directive to deny communications associated with a network service identifier comprising one or more of a network address or a network port; and
  converting the flow policy directive comprises (i) creating a first flow modification rule to drop data communications addressed from the network service identifier and (ii) creating a second flow modification rule to drop data communications addressed to the network service identifier.

18. The method of claim 13, wherein:
receiving the flow policy directive comprises receiving a flow policy directive to redirect communications associated with a network service identifier to a redirect internet address, the network service identifier comprising one or more of a network address or a network port; and
converting the flow policy directive comprises:
creating a first redirect flow policy trigger rule to cause the one or more network switches to forward to the computing device a first redirect flow policy trigger packet addressed from the network service identifier;
creating a second redirect flow policy trigger rule to cause the one or more network switches to forward to the computing device a second redirect flow policy trigger packet addressed from the redirect internet address;
creating, in response to receiving a first or second redirect flow policy trigger packet, a first flow modification rule to (i) forward to the redirect internet address data communications addressed from the network service identifier and addressed to a second network service identifier of the first or second redirect flow policy trigger packet and (ii) modify the data communications to identify the redirect internet address; and
creating, in response to receiving the first or second redirect flow policy trigger packet, a second flow modification rule to (i) forward to the network service identifier data communications addressed from the redirect internet address and addressed to the network service identifier and (ii) modify the data communications to identify the second network service identifier, wherein the first flow modification rule and the second flow modification rule have a higher priority than the first redirect flow policy trigger rule and the second redirect flow policy trigger rule.

19. A security actuator for actuating flow policy directives in a dynamically programmable computer network, the security actuator comprising a plurality of instructions embodied in one or more non-transitory machine accessible storage media of a computing device that, when executed, cause the computing device to:

monitor the dynamically programmable network for receipt of a flow policy directive from a source of flow policy directives, and in response to the monitoring:

initiate an automated mechanism to communicate with one or more network switches of the dynamically programmable computer network, the automated mechanism to:

monitor for packets having one or more criteria matching a trigger rule; and in response to a packet having a criterion matching the trigger rule, cause the one or more network switches to implement the flow policy directive, receipt of the flow policy directive comprises to receive a flow policy directive to quarantine communications associated with a network service identifier to a notifier internet address, the network service identifier to include one or more of a network address or a network port; and to implement the flow policy directive comprises to:

create a first quarantine trigger rule to cause the one or more network switches to forward to a computing device a first quarantine trigger packet addressed from the network service identifier;

create a second quarantine trigger rule to cause the one or more network switches to forward to the computing device a second quarantine trigger packet addressed to the network service identifier;

create, in response to receipt of the first or second quarantine trigger packet associated with a predefined network service, a first flow modification rule to (i) forward to the notifier internet address data communications addressed from the network service identifier and (ii) modify the data communications to identify the notifier internet address; and create, in response to the receipt of the first or second quarantine trigger packet a second flow modification rule to (i) forward to the network service identifier data communications addressed from the notifier internet address and (ii) modify the data communications to identify the second network service identifier, wherein the first flow modification rule and the second flow modification rule have a higher priority than the first quarantine trigger rule and the second quarantine trigger rule;

wherein the security actuator, before actuating, parses the flow policy directives to identify at least one valid command.

20. The security actuator of claim 19, wherein the automated mechanism is to cause the one or more network switches to forward the matching packet to the security actuator.

21. The security actuator of claim 19, wherein the automated mechanism is to cause the security actuator to, in response to the matching packet, create one or more packet disposition directives based on the flow policy directive.

22. The security actuator of claim 19, wherein the security actuator is to, in response to a determination by the automated mechanism that a packet has a criterion matching the first or second quarantine trigger rule, transmit a packet disposition directive to a security mediator of the dynamically programmable network.

23. The security actuator of claim 19, wherein the security actuator is to create a plurality of packet disposition directives in response to the flow policy directive, and the packet disposition directives comprise:

a packet disposition trigger rule to cause the one or more network switches to forward to the security actuator a first packet disposition trigger packet addressed from the network service identifier;

a flow modification rule to one of: drop, forward, deny and redirect data communications that match the trigger packet addressed from the network service identifier.

24. The security actuator of claim 23, wherein the flow modification rule has a higher priority than the packet disposition trigger rule.

25. The security actuator of claim 23, wherein the security actuator is to generate a packet-out in response to receipt of the first packet disposition trigger packet.

26. The security actuator of claim 23, wherein the packet disposition directives comprise a second packet disposition trigger rule to cause the one or more network switches to forward to the security actuator a second packet disposition trigger packet addressed to the network service identifier and a flow modification rule to one of: drop, forward, deny and redirect data communications that match the first or second packet disposition trigger packet addressed to the network service identifier.

27. The security actuator of claim 24, wherein the security actuator is to create a plurality of packet disposition directives in response to the flow policy directive, and the packet disposition directives comprise:

another packet disposition trigger rule to cause the one or more network switches to forward to the security actuator another trigger packet addressed from a network service identifier; and a flow modification rule to forward to an internet address data communications addressed from the network service identifier.

28. The security actuator of claim 27, wherein the flow modification rule is to modify the data communications to identify the internet address.

* * * * *